(12) United States Patent
Wallace

(10) Patent No.: US 9,902,144 B2
(45) Date of Patent: Feb. 27, 2018

(54) SHAPED ARTICLES HAVING PEELABLE, PERFORATED SURFACES AND THEIR USE FOR SEGREGATING PARTICULATE MATERIALS, SUCH AS IN ANIMAL LITTER TRAYS

(75) Inventor: Millard F. Wallace, Orwigsburg, PA (US)

(73) Assignee: Converter Manufacturing, LLC, Orwigsburg, PA (US)

( * ) Notice: Subject to any disclaimer, the term of this patent is extended or adjusted under 35 U.S.C. 154(b) by 0 days.

(21) Appl. No.: 13/566,497

(22) Filed: Aug. 3, 2012

(65) Prior Publication Data
US 2012/0291712 A1    Nov. 22, 2012

Related U.S. Application Data

(63) Continuation-in-part of application No. 12/762,887, filed on Apr. 19, 2010, now abandoned, which is a
(Continued)

(51) Int. Cl.
*B65D 21/032* (2006.01)
*B32B 38/18* (2006.01)
(Continued)

(52) U.S. Cl.
CPC ........ *B32B 38/1866* (2013.01); *A01K 1/0107* (2013.01); *A01K 1/0114* (2013.01); *B32B 9/02* (2013.01); *B32B 27/304* (2013.01); *B32B 27/32* (2013.01); *B32B 27/34* (2013.01); *B32B 27/36* (2013.01); *B32B 37/12* (2013.01); *B65D 1/34* (2013.01); *B65D 25/16* (2013.01); *B29C 51/10* (2013.01); *B29C 51/14* (2013.01); *B29C 51/425* (2013.01); *B29C 2791/006* (2013.01); *B29K 2023/06* (2013.01); *B29K 2023/12* (2013.01); *B29K 2025/00* (2013.01); *B29K 2027/06* (2013.01); *B29K 2067/00* (2013.01); *B29K 2077/00* (2013.01); *B29L 2009/001* (2013.01); *B29L 2009/003* (2013.01); *B32B 7/12* (2013.01);
(Continued)

(58) Field of Classification Search
CPC ....................... B65D 21/0209; B65D 81/3205
USPC ............ 220/573, 573.4, 570, 571.1, 495.01, 220/495.02, 4.27, 4.26; 119/161, 165, 119/472
See application file for complete search history.

(56) References Cited

U.S. PATENT DOCUMENTS 2,542,413 A * 2/1951 Ibsch, Jr. .................... 220/574.3
3,809,013 A * 5/1974 Rigney et al. ................ 119/167
(Continued)

*Primary Examiner* — Stephen Castellano
(74) *Attorney, Agent, or Firm* — Gary D. Colby, J.D.; Dilworth Paxson, LLP

(57) ABSTRACT

The disclosure relates to containers and other shaped articles that have a relatively thick substrate layer and one or more relatively thin liner sheets peelably adhered thereto. Animal litter can be placed atop the liner sheets, preferably in a concave portion to contain the litter. The liner sheets have perforations extending therethrough that permit the passage of non-soiled litter, but do not permit the passage of at least one of animal feces and soiled animal litter, such as clumps of litter and urine. After an animal has deposited waste on or in the litter, the liner sheet can be peeled from the container and waste unable to pass through the perforations can be collected.

4 Claims, 6 Drawing Sheets

Related U.S. Application Data continuation-in-part of application No. 11/734,285, filed on Apr. 12, 2007, now Pat. No. 7,721,910, and a continuation-in-part of application No. 12/620,460, filed on Nov. 17, 2009, now abandoned.

(60) Provisional application No. 60/794,409, filed on Apr. 24, 2006, provisional application No. 60/855,597, filed on Oct. 31, 2006.

(51) Int. Cl.

| | | |
|---|---|---|
| *B32B 37/12* | (2006.01) | |
| *B65D 1/34* | (2006.01) | |
| *B65D 25/16* | (2006.01) | |
| *A01K 1/01* | (2006.01) | |
| *B32B 9/02* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B29C 51/10* | (2006.01) | |
| *B29C 51/14* | (2006.01) | |
| *B29C 51/42* | (2006.01) | |
| *B29K 23/00* | (2006.01) | |
| *B29K 25/00* | (2006.01) | |
| *B29K 27/06* | (2006.01) | |
| *B29K 67/00* | (2006.01) | |
| *B29K 77/00* | (2006.01) | |
| *B29L 9/00* | (2006.01) | |
| *B32B 7/12* | (2006.01) | |
| *B32B 15/08* | (2006.01) | |
| *B32B 27/08* | (2006.01) | |
| *B32B 38/12* | (2006.01) | |

(52) U.S. Cl.
CPC ............. *B32B 15/08* (2013.01); *B32B 27/08* (2013.01); *B32B 38/12* (2013.01); *B32B 2309/105* (2013.01); *B32B 2439/00* (2013.01)

(56) References Cited

U.S. PATENT DOCUMENTS

| | | | | |
|---|---|---|---|---|
| 4,182,462 A | * | 1/1980 | Buff, Jr. ................. | A47G 19/03 220/495.03 |
| 4,253,580 A | * | 3/1981 | Doi ........................ | B65D 53/00 215/228 |
| 4,312,295 A | * | 1/1982 | Harrington ................... | 119/167 |
| 4,325,325 A | * | 4/1982 | Larter ........................... | 119/166 |
| 4,615,300 A | * | 10/1986 | McDonough ................. | 119/167 |
| 4,640,225 A | * | 2/1987 | Yananton ..................... | 119/169 |
| 4,765,123 A | * | 8/1988 | Caldwell ........................ | 53/459 |
| 4,784,082 A | * | 11/1988 | Wolfe ............................ | 119/167 |
| 4,870,924 A | * | 10/1989 | Wolfe ............................ | 119/167 |
| 4,872,420 A | * | 10/1989 | Shepard ........................ | 119/170 |
| 4,944,427 A | * | 7/1990 | Yamada et al. ........... | 220/495.01 |
| 5,012,765 A | * | 5/1991 | Naso et al. ................... | 119/166 |
| 5,027,748 A | * | 7/1991 | Wolak .......................... | 119/168 |
| 5,062,392 A | * | 11/1991 | Lavash ......................... | 119/167 |
| 5,121,712 A | * | 6/1992 | Schulein et al. ............. | 119/167 |
| 5,154,137 A | * | 10/1992 | Stanaland ..................... | 119/496 |
| 5,168,834 A | * | 12/1992 | Buschur ........................ | 119/166 |
| 5,207,772 A | * | 5/1993 | Lauretta et al. .............. | 119/167 |
| 5,211,133 A | * | 5/1993 | Foley ............................. | 119/166 |
| 5,325,815 A | * | 7/1994 | Gumpesberger .............. | 119/166 |
| 5,411,167 A | * | 5/1995 | Weder ........................ | 220/62.11 |
| 5,445,110 A | * | 8/1995 | Birnie .......................... | 119/61.5 |
| 5,460,289 A | * | 10/1995 | Gemmell ................. | 220/495.02 |
| 5,503,293 A | * | 4/1996 | Weder ........................ | 220/62.11 |
| 5,551,376 A | * | 9/1996 | Lundeen et al. .............. | 119/167 |
| 5,577,462 A | * | 11/1996 | Korth ............................ | 119/166 |
| 5,615,639 A | * | 4/1997 | Knight .......................... | 119/168 |
| 5,653,089 A | * | 8/1997 | Weder .............................. | 53/397 |
| 5,752,466 A | * | 5/1998 | Lundeen et al. .............. | 119/167 |
| 5,782,057 A | * | 7/1998 | Weder ........................... | 715/781 |
| 5,850,798 A | * | 12/1998 | Engel ............................ | 119/170 |
| 5,890,452 A | * | 4/1999 | Lundeen et al. .............. | 119/167 |
| 5,975,299 A | * | 11/1999 | Weder et al. ................. | 206/423 |
| D426,684 S | * | 6/2000 | Kenney ......................... | D30/161 |
| 6,135,058 A | * | 10/2000 | Jaeger ........................... | 119/167 |
| 6,295,949 B1 | * | 10/2001 | Willis ........................... | 119/165 |
| 6,474,262 B1 | * | 11/2002 | Ceccon ......................... | 119/166 |
| 6,668,755 B1 | * | 12/2003 | Koster .......................... | 119/167 |
| 6,679,398 B1 | * | 1/2004 | O'Brien ................... | 220/495.02 |
| 6,848,394 B1 | * | 2/2005 | Sexton .......................... | 119/170 |
| 6,941,894 B2 | * | 9/2005 | Scotto D'Anielo .......... | 119/166 |
| D569,567 S | * | 5/2008 | Kohn .......................... | D32/53.1 |
| 7,481,182 B2 | * | 1/2009 | Simpson et al. .............. | 119/168 |
| 7,597,063 B2 | * | 10/2009 | Hartzell ........................ | 119/166 |
| 7,673,585 B1 | * | 3/2010 | Emmi et al. .................. | 119/168 |
| 8,074,603 B2 | * | 12/2011 | Ohlman et al. ............... | 119/167 |
| 2004/0134917 A1 | * | 7/2004 | Carnegie ....................... | 220/570 |
| 2009/0126642 A1 | * | 5/2009 | Coccia ................. | A01K 1/0107 119/165 |

* cited by examiner

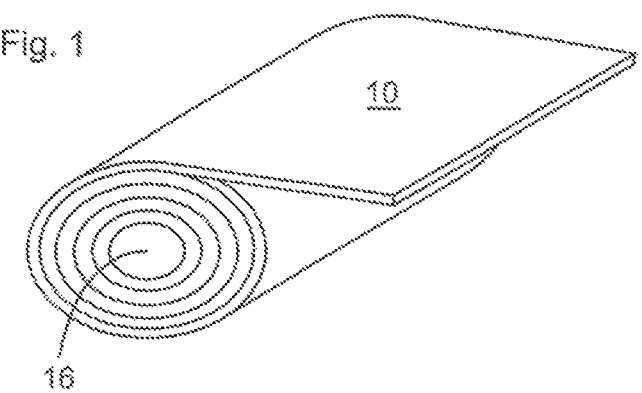
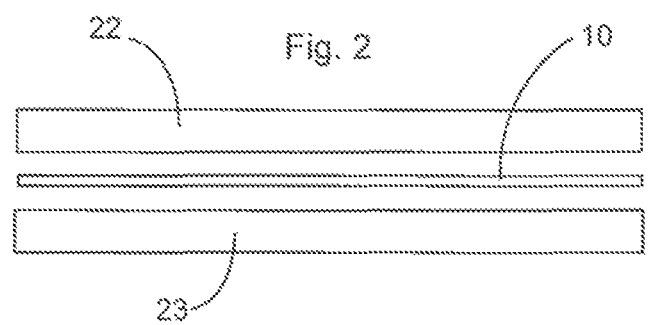
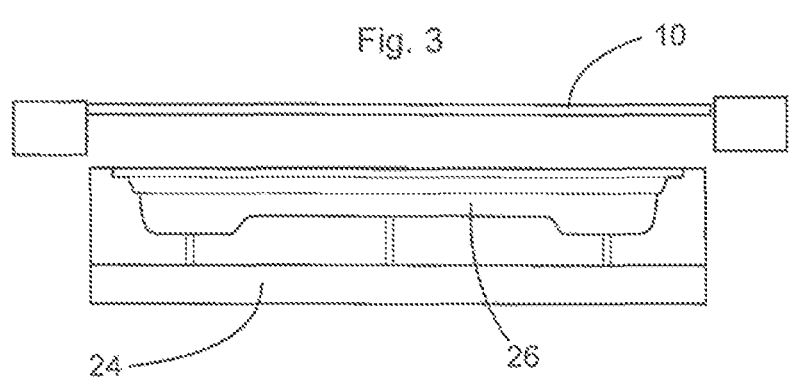
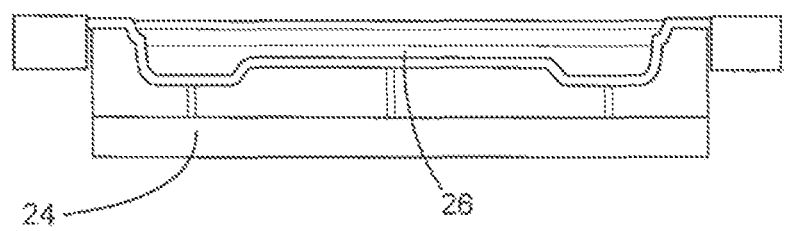

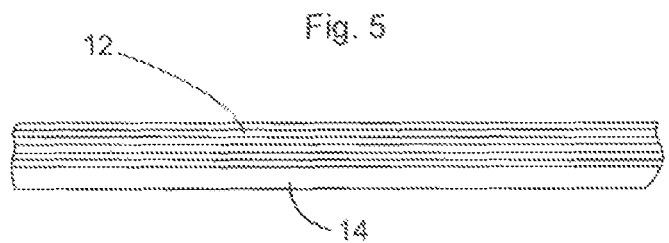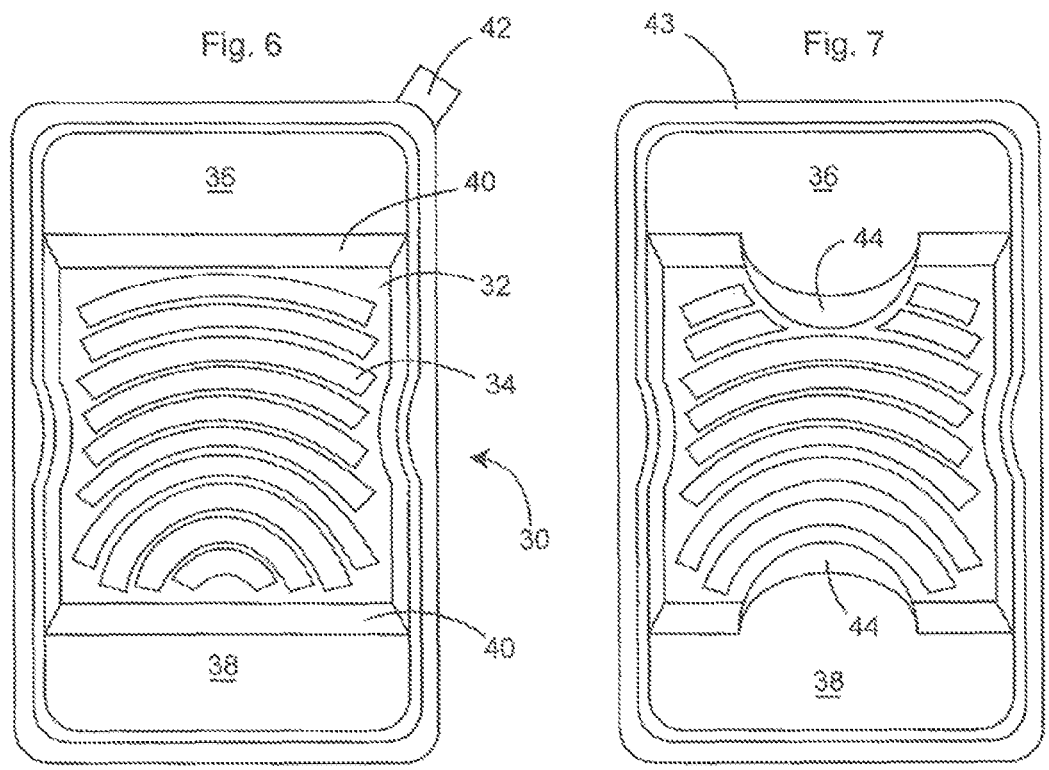

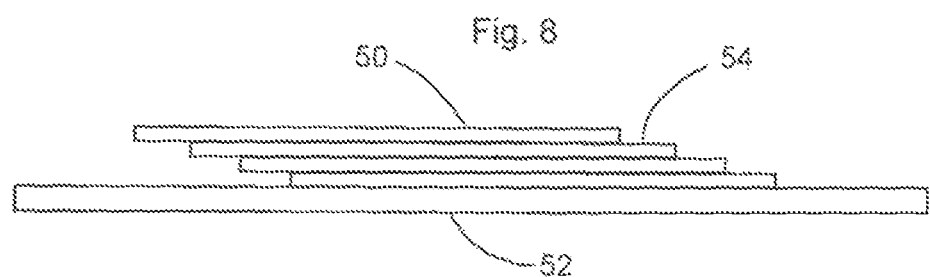
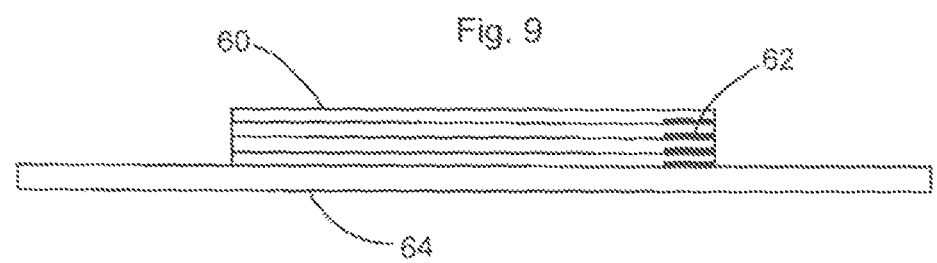
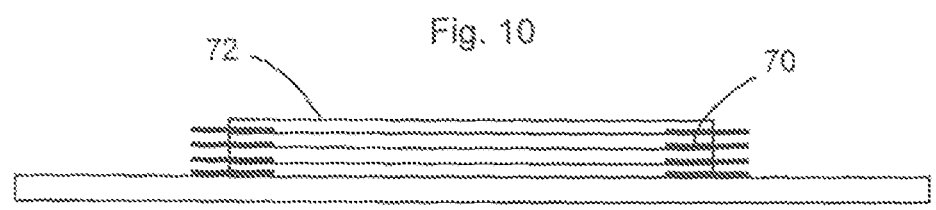

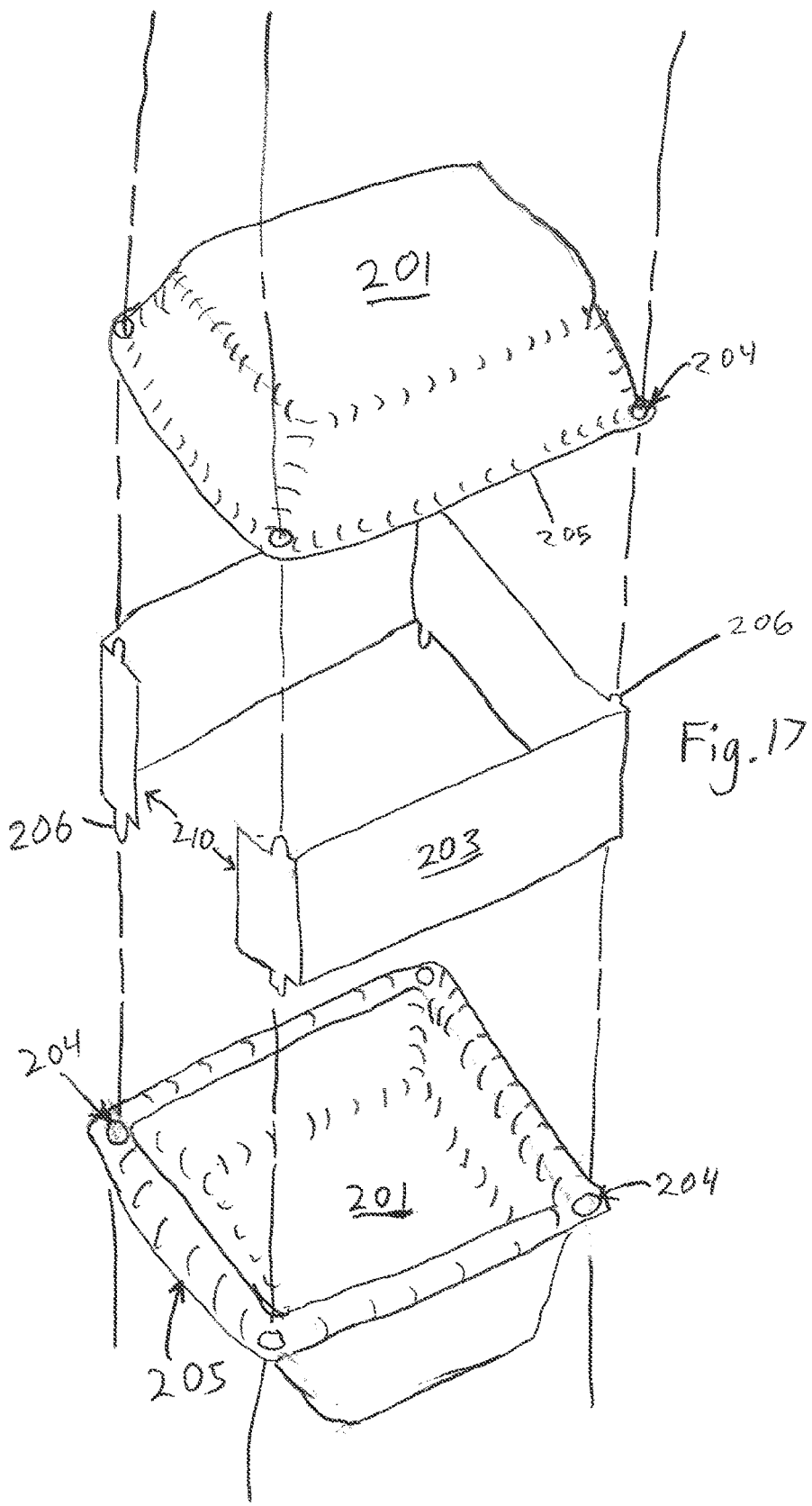

SHAPED ARTICLES HAVING PEELABLE, PERFORATED SURFACES AND THEIR USE FOR SEGREGATING PARTICULATE MATERIALS, SUCH AS IN ANIMAL LITTER TRAYS

CROSS-REFERENCE TO RELATED APPLICATIONS

This application is a continuation-in-part of U.S. patent application Ser. No. 12/762,887, filed Apr. 19, 2010, now abandoned, which is a continuation-in-part of U.S. patent application Ser. No. 11/734,285 filed Apr. 12, 2007, now U.S. Pat. No. 7,721,910, and a continuation-in-part of U.S. patent application Ser. No. 12/620,460, filed Nov. 17, 2009, now abandoned, and U.S. patent application Ser. No. 11/734, 285 claims the benefit of U.S. provisional patent application No. 60/794,409, filed Apr. 24, 2006 and U.S. provisional patent application No. 60/855,597, filed Oct. 31, 2006, each of which is incorporated herein by reference in its entirety.

BACKGROUND OF THE DISCLOSURE

This disclosure relates generally to multiple-polymeric-layer thermoformable materials and articles formed from such materials.

It is common for containers to have removable liners. By way of example, garbage pails commonly include thin removable plastic bags, such that can garbage can be contained within the can for a period of time and then removed without leaving behind undesirable residue. Similarly, paint trays often have removable liners that can be discarded once soiled.

Disposable liners have been employed by other in the context of animal litter trays, such as those used to contain urine and feces produced by cats, rabbits, and rodents kept as pets. A significant drawback of such liners has been that a substantial amount of unused litter can be retained within the liner during its disposal, resulting in waste of otherwise usable litter. The advent of "clumpable" litters (particulate materials which adhere and/or expand to form large clumps upon absorption of liquid) has facilitated development of animal litter trays from which solid and clumped liquid animal wastes can be removed with reusable screens, slotted or perforated sifting apparatuses, and the like. However, even such trays have the significant drawback that the screening or sifting apparatus tends to accumulate used litter, resulting in undesirable odors and decreased efficacy over time. Even for trays for which the sifting apparatus is separable from the tray, cleaning and operation of the apparatus can be inconvenient.

It would be advantageous if a animal litter tray were available that facilitates removal of solid and clumped animal wastes. The subject matter disclosed herein include such trays.

BRIEF SUMMARY OF THE DISCLOSURE

The disclosure relates to a container having a disposable, perforated liner peelably attached to at least a portion thereof. The container includes at least a shaped substrate having an interior surface and one or more peelable liners. Each peelable liner has an upper surface and a lower surface, and conforms to the shape of the interior surface. Each peelable liner is also attached to the interior surface, preferably with an adhesive. The liner can be peeled from the substrate. The liners also have one or more perforations extending therethrough. Materials which rest upon the upper surface of the uppermost liner can be retained within the container if they have a size and/or shape sufficient to pass through the perforations when the uppermost liner is peeled from the interior surface. In one embodiment, the substrate and liner are formed (e.g., thermoformed) simultaneously. The container can include multiple liner (including one designated "the bottom liner"), with each liner except for the bottom liner having its lower surface adhered to the upper surface of another liner, and with the lower surface of the bottom liner being adhered to the substrate. Tabs can be included between liners (e.g., at one or more edges) and/or between the bottom liner and the substrate for facilitating peeling of the liners from the container.

The substrate and liners can be shaped in the form of any of a variety of containers, such as trays, cans, animal (e.g., pet) litter trays, food containers, and the like. For example, when in the shape of an animal litter tray, the substrate can have an interior with a substantially rectangular shape (preferably with rounded corners) and liners adhered to substantially the entire interior portion, the liners defining multiple perforations extending therethrough primarily in the central portion of the interior surface, with the perforations sized such that free-flowing "clumpable" litter can pass through the perforations, while "clumped" animal litter (e.g., an aliquot of feline urine that forms a clump in the litter) and feline feces cannot pass through the perforations. In such a animal litter tray, when the liner is peeled from around the exterior portions of the concave interior and lifted by those peeled portions, the liner can be peeled from the remainder of the interior and clumpable litter can flow through the (perforations, while feces and clumped litter is retained within the peeled liner. The peeled liner and its contents can be discarded after most or all of the free-flowing litter has passed through the perforations.

The disclosure also relates to a method of making a container with an interior open-topped cavity and at least one peelable liner. In the method, a planar substrate has attached to a surface thereof a liner sheet. The liner sheet is attached the substrate with a peelable adhesive. Once attached, the substrate and liner sheet(s) can be shaped (e.g., thermoformed) to form the container. The liner sheets conform to the shape of the substrate and form peelable layers that can be removed therefrom. In one embodiment of this method, the container is thermoformed by heating the substrate/liner sheet stack and vacuum- or pressure-forming the stack. The liner sheets preferably have a thickness of from about 1 mil to about 7 mils each, and the substrate preferably has a thickness of from about 10 mils to about 40 mils. Perforations can be made in the liner sheets prior to shaping of the stack of substrate and liner sheets. Alternatively, the perforations can be made simultaneously with shaping or afterwards, for example by urging a die having a cutting edge formed in the desired shape of the perforations against the lined surface with sufficient force to cut at least one of the liner sheets, while preferably not cutting the substrate (unless perforations are also desired in the substrate, such as with a colander having peelable liners on one or both faces thereof).

The disclosure also relates to a similar method of making a plurality of containers, each having an interior open-topped cavities. This method is similar to the method of making containers having peelable layers, except that the peelable adhesive is preferably omitted and the liner sheets are replaced with additional substrate sheets (that are independently able to retain their shape after forming). This method involves simultaneously forming (e.g., thermoforming) a plurality of stacked planar thermally deformable sheets to form containers with interior open-top cavities, and theater separating the shaped, formed sheets from one another. The stack of multiple substrate sheets can, for example, be provided in the form of a wound, multilayer roll having a release agent between the rolled multilayer stacks. As with single-substrate stacks, the liner(s) in a multi-substrate stack can be perforated before, during, or after shaping, except that perforation during shaping is practical only if at least some of the substrates are also to be perforated.

The disclosure relates to a container that includes a substrate having a shaped side including an interior surface and at least one perforated, peelable liner sheet including a bottom sheet. The container can include multiple perforated liner sheets (and preferably does in "peelable surface container" applications). For example, the containers can include two, four, six, ten, or twenty perforated, peelable liner sheets. Each liner sheet conforms to the shape of the shaped side, including substantially the entire interior surface. Each liner sheet has a lower surface and an upper surface. The lower surface of each liner sheet other than the bottom sheet is releasably adhered to the upper surface of the underlying liner sheet with a peelable adhesive on substantially the entire portion of the lower surface that overlaps the interior surface. The lower surface of the bottom sheet is releasably adhered to the shaped side of the substrate with a peelable adhesive on substantially the entire portion of the bottom sheet that overlaps the interior surface. The perforations of adjacent sheets can be aligned, but need not be, particularly if the liner sheets are perforated prior to lamination to the substrate.

Examples of such containers include those shaped in the form of a tray, a trash can, a bucket, a cat fitter container, a colander, a paint can, a food warming pot, or a plate. The container preferably has an interior surface that includes continuous side walls that surround a central portion, such as a substantially flat portion of a typical cat litter tray. The side walls can be substantially perpendicular to the flat portion (e.g., as in a paint can). Alternatively, the side walls can be slanted outwardly from the flat portion, such that each substantially flat side wall is oriented along its entire length in such a way that the wall defines an obtuse angle with the flat portion when the container is viewed in a cross section taken perpendicularly through the flat portion (e.g., as in a typical cat litter tray). The intersection of the side walls and the flat portion can be rounded. The container can have a substantially flat bottom side for supporting the container when it rests on a supporting surface. In such containers, it is preferable that no liner sheet overlaps the bottom side of the container. The liner sheets preferably cover the entire interior portion (i.e., the sidewalls and the central portion), and can cover some or all of the exterior portion. In one embodiment, the container has a lip or flange that extends away from the interior along the edge of the interior portion, and the liner sheet covers the entire interior portion and at least a portion of the lip or flange, but does not cover any other substantial portion of the container.

In one embodiment of the containers described herein, each perforated liner sheet completely overlaps the underlying liner sheet. A tab can be interposed between the substrate and the bottom sheet for facilitating peeling of the bottom sheet from the substrate. For example, the tab can be interposed between the substrate and the peelable adhesive on the lower surface of the bottom sheet, so that the tab prevents adhesion between the substrate and the bottom sheet at the location of the tab. Similarly, or in addition, the container can have a tab interposed between each pair of liner sheets for facilitating peeling of the overlying liner sheet from the underlying liner sheet. The tab can be interposed between the underlying liner sheet and the peelable adhesive on the lower surface of the overlying liner sheet, so that the tab prevents adhesion between the sheets at the location of the tab. Alternatively, a tab can be formed by folding a liner sheet to form an overlapping portion that acts as a tab for peeling that sheet from the container. In containers having a lip or flange adjacent all or part of the interior portion, the tab can conveniently be situated at the lip or flange, to facilitate peeling of the liner therefrom.

The materials used to construct the substrate of the container described herein are not critical, although they are preferably thermoformable. For example, thermoformable substrates can be formed using materials that include one or more of polyethylene terephthalates, high density polyethylenes, high molecular weight polyethylenes, polypropylenes, polystyrenes, polyvinyl chlorides, polylactates, and copolymers of these. The liner sheets can, but need not, be thermoformable, but should be peelable. Examples of suitable materials for use a peelable liner sheets include one or more of polyethylenes, poly polyethylene terephthalates, nylons, polyvinyl chlorides, polylactates, and copolymers of these. In a container described herein, liner sheets are typically, but not necessarily, made from the same material or very similar materials.

The disclosure is not limited to containers having interior surfaces for containing things, but is more generally applicable to shaped articles and methods of making them. Such shaped articles include a substrate having a shaped side including a shaped surface and at least one peelable liner sheet including a bottom sheet. As with the containers described herein, each liner sheet conforms to the shape of the shaped side, including substantially the entire shaped surface (which is an interior surface for a container, but need not be for, for example, a shaped article having a convex or irregular surface). Each liner sheet has a lower surface and an upper surface. The lower surface of each liner sheet other than the bottom sheet is releasably adhered to the upper surface of the underlying liner sheet with a peelable adhesive on substantially the entire portion of the lower surface that overlaps the shaped surface. The lower surface of the bottom sheet is releasably adhered to the shaped side with a peelable adhesive on substantially the entire portion of the bottom sheet that overlaps the shaped surface.

The subject matter described herein also relates to a thermoformable stack. The stack includes a first sheet of a thermoformable polymer, a second polymeric sheet, and a layer of a first barrier composition interposed between faces of the first and second sheets. The second polymeric sheet overlaps the first sheet at an overlapping region and is capable of maintaining its structural integrity at a thermoforming condition at which the first sheet can be thermoformed. The second sheet is also capable of conforming to the shape of the first sheet as the first sheet is thermoformed at the thermoforming condition. The first barrier composition prevents fusion of the surfaces of the first and second sheets at the thermoforming condition in at least a portion of the overlapping region. When the stack is subjected to the thermoforming condition, the first sheet assumes a thermoformed shape, the shape of the second sheet conforms to the shape of the first sheet, and the first and second sheets do not fuse in the portion of the overlapping region in which the first barrier composition occurs. At least one of the first and second sheets is preferably perforated, while at least one sheet in the stack is not perforated; in this configuration, one shaped sheet can be separated from the remainder of the stack and any materials capable of passing through the perforations can remain associated with the stack by passing through the perforations in the separated sheet.

The first and second sheets can (but need not) have substantially the same composition and/or thickness. Even if not of the same composition as the first sheet, the second sheet can be thermoformable at the thermoforming condition.

If at least a portion of the overlapping region is not coated with the first barrier composition, the first and second sheets can be selected such that their opposed surfaces fuse at the non-coated portion at the thermoforming condition. The first and second sheets can be bound to one another (e.g., at an edge portion where the first barrier composition does not occur), either by fusion or otherwise (e.g., using an adhesive, a staple, etc.).

The stack can include one or more tabs interposed between the first sheet and second sheets and extending beyond an edge of the second sheet. The tab facilitates separation of the first and second sheets after thermoforming.

The first barrier composition can contain (or be composed of) an adhesive that peelably adheres the first and second sheets. A tab can be interposed between the first sheet and the adhesive and extend beyond an edge of the second sheet. In such an arrangement, the tab prevents adhesion between the first sheet and the second sheet at the location of the tab, facilitating peeling of the first and second sheets.

The stack can include a non-polymeric sheet adjacent one of the first and second sheets. For example, the non-polymeric sheet can be a metal sheet and the stack can have an adhesive interposed between the metal first sheet and the second sheet. Thus, for example, the stack can consist of a metal sheet having a plurality of perforated plastic sheets peelably adhered thereto.

The subject matter disclosed herein also includes articles formed by thermoforming the stack described herein. Examples of such articles include animal litter trays, such as those used for pet domestic cats.

The stack can include a plurality of (e.g., 2, 3, 5, or 10) overlapping second polymeric sheets. In this embodiment, each second sheet overlaps the first sheet at the overlapping region, is capable of maintaining its structural integrity at the thermoforming condition, is capable of conforming to the shape of the first sheet as the first sheet is thermoformed at the thermoforming condition, and has a layer of a second barrier composition interposed between it and each adjacent second sheet in a portion of the overlapping region. At least one of the second polymeric sheets is perforated. The first barrier composition prevents fusion of the surfaces of the first sheet and the adjacent second sheet at the thermoforming condition. The second barrier composition prevents fusion of the surfaces of adjacent second sheets at the thermoforming condition. When the stack is subjected to the thermoforming condition, the first sheet assumes a thermoformed shape, the shape of each of the second sheets conforms to the shape of the first sheet, and the sheets do not fuse in the portion of the overlapping region. Each of the second sheets can have substantially the same composition, which can be substantially the same composition as the first sheet.

The identity of the second sheets is not critical. They can be made of the same material or different materials. The second sheets can, for example, each be a blown polymer sheet, a cast polymer sheet, a co-extruded polymer sheet, a monolayer polymer sheet, a molded polymer sheet, or a thermoformable polymer sheet. Combinations of these sheets can be used.

In an important embodiment of the stack described herein, the first barrier composition contains (or is) an adhesive that peelably adheres the first sheet and the adjacent second sheet and the second barrier composition comprises an adhesive that peelably adheres adjacent second sheets. The first and second barrier compositions can be the same or different.

The stacks (or articles made therefrom) can have an image text, a picture, a logo, an opaque color field, etc.) printed on the outer surface of the outermost second sheet. Alternatively, the outermost second sheet can be nonopaque and have an image printed thereon on the surface adjacent the second barrier composition interposed between the outermost and underlying second sheets, in fact multiple second sheets, or even each second sheet, can have an image printed thereon.

The thickness of the sheets is not critical, in one embodiment, the thickness of the first sheet is at least three times the thickness of the adjacent second sheet. For example, the thickness of the first sheet can be from 10 mils to about 40 mils. The thickness of each second sheet can be substantially the same (or not). For example the thickness of each second sheet can be from 0.5 mil to about 7 mils.

The stack described herein can be coiled in a roll having a release agent interposed between layers of the stack. The release agent permits the stack to be unrolled without delaminating its sheets. An example of a suitable release agent is a liquid silicone.

The subject matter disclosed herein includes a shaped article that includes multiple, substantially identically-shaped and identically-perforated sheets of thermoformable polymers that overlap at an overlapping region. The sheets have a layer of a barrier composition interposed between them in a portion of the overlapping region. The article is separable into multiple, substantially identically-shaped, perforated subarticles by separation of the sheets. The article is useful as an assembly of articles (e.g., animal litter tray liners) that can be easily separated from one another.

The subject matter disclosed herein also includes a shaped article that includes a shaped thermoformable polymer sheet, a plurality of second sheets of a polymer (at least one of which second sheets is perforated), a first barrier composition interposed between and peelably adhering the thermoformable sheet and the adjacent second sheet, and a second barrier composition interposed between and peelably adhering adjacent second sheets. The second sheets overlap the thermoformable sheet at an overlapping region and conform to the shape of the thermoformable sheet at substantially the entire overlapping region. The second sheets are peelably removable from the article. The article can include tabs between adjacent second sheets and a tab between the thermoformable sheet and the adjacent second sheet.

The subject matter disclosed herein includes a pressure-deformable stack which includes first and second sheets and a first peelable adhesive interposed therebetween. The first sheet is made of a pressure-deformable material (e.g., a metal sheet) that retains its shape upon pressure-forming. The second sheet is made of a polymer (e.g., nylon) which can withstand the forces inherent in the pressure-forming process without tearing or becoming punctured. The stack can include multiple second sheets, with each second sheet having at least one other second sheet adhered thereto using a second peelable adhesive (which can be identical to the first) interposed therebetween.

BRIEF DESCRIPTION OF THE DRAWINGS

FIG. 1 is a perspective view of a roll of stacked liner sheets and a substrate sheet (master PAD roll) ready for thermoforming.

FIG. 2 is a sectional side view of a tray sheet section positioned between heaters prior to thermoforming.

FIG. 3 is a sectional side view of a heated tray sheet section positioned in a thermoforming apparatus prior to thermoforming.

FIG. 4 is a sectional end view of a thermoformed tray system prior to ejection from the thermoforming apparatus.

FIG. 5 is a detailed sectional side view of a segment of a stack of liner sheets and a substrate sheet.

FIG. 6 is a top view of a preferred tray system.

FIG. 7 is a top view of an alternative preferred tray system.

FIG. 8 is a side view of an alternative tear tab assembly.

FIG. 9 is a side view of another alternative tear tab assembly.

FIG. 10 is a side view of yet another alternative tear tab assembly.

FIG. 17 is an exploded view of an animal litter tray apparatus described herein.

DETAILED DESCRIPTION

Figure 11:
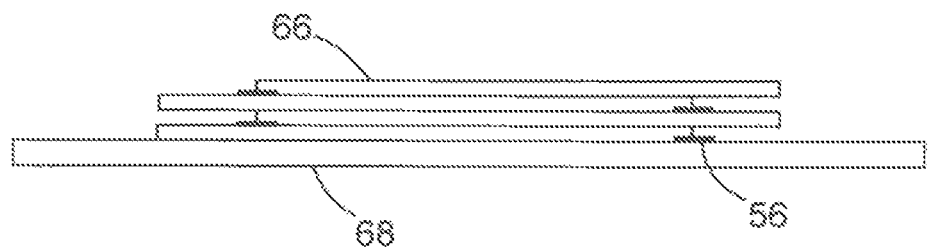
FIG. 11 is a side view of yet another tear tab assembly.

In this disclosure, terms such as horizontal, upright, vertical, above, below, beneath, and the like, are used solely for the purpose of clarity in illustrating the subject matter disclosed herein, and should not be taken as words of limitation. The drawings are for the purpose of illustrating the subject matter disclosed herein and are not intended to be to scale.

In one embodiment, the subject matter of this disclosure relates to a thermoformable stack. The stack includes a first sheet of a thermoformable polymer and at least a second polymeric sheet (sometimes referred to herein as a "Finer" sheet) that overlaps the first sheet at an overlapping region. The first and second sheets can have the same composition and thickness, or these characteristics can be different. The stack can include multiple second polymeric sheets (made of the same or different polymers and having the same or different thicknesses). The stack can also include sheets of other materials, such as metal sheets. A layer of a first barrier composition is interposed between faces of the first and second sheets in at least a portion of the overlapping region. The first barrier composition prevents fusion of the surfaces of the first and second sheets at the thermoforming condition. When the stack is subjected to the thermoforming condition, the first sheet assumes a thermoformed shape, the shape of the second sheet conforms to the shape of the first sheet, and the first and second sheets do not fuse in the portion of the overlapping region.

When the stack includes at least one pressure-deformable sheet, such as a metal sheet, as a first and/or second sheet, the stack can be shaped using ordinary bending, stamping, and other pressure-based shaping methods. Such stacks preferably include first and second sheets that can withstand pressure, shear, deformation, and stretching forces inherent in pressure-based shaping methods without tearing or becoming punctured. By way of example, thin, stretchable nylon sheets can be adhered to an aluminum sheet, with a first barrier composition interposed between the aluminum sheet and the adjacent nylon sheet and a second barrier composition interposed between adjacent nylon sheets. Such an aluminum/nylon stack can be subjected to a press that deforms the aluminum sheet into a desired shape, with the nylon sheets stretching to match the shape without becoming substantially de-adhered from the surface of the aluminum sheet or from one another. In this manner, shaped metal objects having peelable polymeric layers can be made, as can articles made from other pressure-deformable materials (e.g., uncured ceramic pastes).

The second sheet is made of a material that is selected such that it is capable of maintaining its structural integrity at a thermoforming condition at which the first sheet can be thermoformed. The second sheet is capable of conforming to the shape of the first sheet as the first sheet is thermoformed at the thermoforming condition. If desired, the second sheet can be a material that is also thermoformable at the thermoforming condition, but this is not a requirement. However, if a non-thermoformable second sheet is used, the second sheet may detach, deform, or pull away from the first sheet following thermoforming. Even if the second sheet is thermoformable, these behaviors can nonetheless manifest themselves if the first and second sheets are made of different materials (owing, for example, to different coefficients of thermal expansion). When the second sheet is a non-thermoformable material, the characteristics of the second sheet and any adhesive in the adjacent barrier compositions should be selected to retain the desired configuration of first and second sheets in the finished article. By way of example, if one or more of the second sheets is an elastic material, then the elastic material should be selected such that it can temporarily deformed at the thermoforming conditions, the adhesive(s) should be selected such that they will adherently oppose the tendency of the elastic material to resume its original shape after thermoforming, or some combination of these.

The second sheet can be perforated. In one embodiment, the second sheet is perforated prior to thermoforming. In that embodiment, the stack can be made by laminating multiple perforated second sheets with the first (substrate) sheet, regardless of whether the perforations are made before or after lamination and regardless of whether the perforations in two or more second sheets are aligned with one another. In another embodiment, the second sheet is perforated after thermoforming the stack, such as by applying a cutting, abrading, piercing, or inciting apparatus to one or more of the second sheets. The perforations can be round holes, elongated slits, abraded patches, or a selected geometric shape defined by a pattern cut into the second sheet. When such a pattern is cut into the second sheet, the portion of the sheet within the pattern can be completely severed from the remainder of the second sheet (e.g., by a circular cut that completely surrounds the portion) or it can be left attached (e.g., a tab formed by cutting three sides of a square in the second sheet, while the fourth side is not cut). When the portion is completely severed from the second sheet, the interior portion can be removed or left in place.

One or more tabs can be interposed between the first sheet and second sheets. If a tab extends beyond an edge of either sheet, the tab can be used to facilitate separation of the first and second sheets after thermoforming. The tab can be adhered to either sheet or to neither.

In one embodiment, the tab is relatively fixedly adhered to the lower surface of a liner sheet that overlies another liner sheet or the substrate. The tab is either peelably adhered to or not adhered to the underlying liner sheet (or substrate), such that the overlying liner sheet can be peeled from the underlying liner sheet (or substrate) by grasping the tab and pulling the overlying sheet by way of the tab.

In a second embodiment, the tab is relatively fixedly adhered to the underlying sheet (or to the shaped surface of the substrate) and either peelably adhered to or not adhered to the overlying liner sheet, such that the overlying liner sheet can be peeled from the underlying liner sheet by scratching (e.g., with a fingernail or an edged instrument, such as the tine of a fork) the edge of the overlying liner sheet that overlies the tab to begin partial peeling of the overlying liner sheet at the location of the tab, and then grasping the partially peeled portion of the overlying liner sheet and manually peeling the remainder of the overlying liner sheet away from the underlying liner by pulling on the partially peeled portion. In this second embodiment, if the overlying liner sheet is peelably adhered to the tab (i.e., rather than not adhered at all to the tab), then adhesion of the overlying liner sheet to the tab can exclude materials (e.g., dust or liquids) from the space between the tab and overlying liner sheet, rendering the tab surface clean upon peeling the overlying liner sheet therefrom.

In another useful embodiment, no tab is incorporated beneath a sheet, and instead, there is printing, a color difference (between the sheet and the underlying sheet or substrate), or some other indicium that identifies the edge of the sheet. By aid of this indicium, a user can discern the edge of the peelable sheet and can begin peeling it, e.g., by inserting a thin item (e.g., a card) beneath the edge or by scratching at the edge with a relatively sharp instrument, such as a fingernail, in yet another useful embodiment, the tab is not a material discrete from the peelable sheet, but is instead a part of that peelable sheet. By way of example, the part can be a portion of the peelable sheet that extends away from the remainder of the peelable sheet at an edge thereof and that is not adhered to the underlying surface. Further by way of example, the part can be an edge of the sheet (or a portion that extends from the edge) that is folded back beneath the peelable sheet (e.g., all or part of one edge of the sheet can be folded under itself in a strip about one-quarter inch wide). If the folded-back edge (or portion) lies atop adhesive on top of the underlying surface, then the folded-back edge (or portion) will "balloon" out away from the underlying surface when the edge is scratched, rubbed, or displaced, facilitating grasping and peeling of the peelable sheet. If, the peelable sheet has adhesive on its underside prior to folding back the edge or portion thereof, then the overlapping layers of the tab will adhere to one another, but not to the underlying surface, yielding a graspable tab that can be easily accessed from above the tabbed, peelable sheet.

Although a loose stack of polymeric sheets can be thermoformed using the materials and methods described herein, it can be convenient to bind the first and second sheets to one another prior to thermoforming (e.g., to facilitate combination, storage, shipping, handling, manufacture, and alignment of the sheets). The means used to bind the sheets to one another is not critical, but preferably does not affect the properties of the sheets in the region(s) of the sheets that are to be thermoformed. By way of example, the sheets can be bound together using a glue applied to a common edge of the first and second sheets, by fusion of a common edge of the first and second sheets, by stapling the first and second sheets together, by adhering the sheets together using an adhesive applied between the sheets at an inter-sheet area distinct from the shaped section of the sheets, or by other means.

In order to prevent detachment or deformation of the second sheet away from the first sheet after thermoforming, the first barrier composition can include an adhesive that peelably adheres the first and second sheets. By incorporating such an adhesive into the first barrier composition, thermoformed articles can be made in which the second sheet can be peeled away from the first sheet, preferably (i.e., by judicious selection of an adhesive) without tearing either of the first and second sheets. All, or only a portion, of the overlapping region can be coated with the adhesive-containing first barrier composition. When a tab is interposed between polymer sheets, the tab can be adhered to the adhesive and used to pull the edge of the sheet to which the tab is adhered away from the adjacent sheet to which the tab is not adhered. In alternative configurations, the adhesive can be incorporated into the barrier composition or the adhesive can be a composition discrete from the barrier compositions. By way of example, a barrier composition having perforations or holes therethrough can be interposed between sheets and a separate adhesive interposed between the sheets on one side of the barrier composition (i.e., the adhesive contacting both sheets through the holes or perforations).

An important embodiment of the subject matter disclosed herein is a stack (sometimes referred to herein as a "master pad roll" when provided in the form of a rolled stack) of overlapping polymeric sheets. This stack includes the first sheet, which is a thermoformable polymer, and a plurality (e.g., 2, 3, 6, 10, or 20) of second polymeric sheets. Each second sheet overlaps the first sheet at the overlapping region, is capable of maintaining its structural properties each sheet maintains its integrity and, preferably, its pliability and approximate thickness) at the thermoforming condition, is capable of conforming to the shape of the first sheet as the first sheet is thermoformed at the thermoforming condition, and has a layer of a second barrier composition interposed between it and each adjacent second sheet in a portion of the overlapping region. The first barrier composition prevents fusion of the surfaces of the first sheet and the adjacent second sheet at the thermoforming condition. The second barrier composition (which may be identical to the first) prevents fusion of the surfaces of adjacent second sheets at the thermoforming condition. When the stack is subjected to the thermoforming condition, the first sheet assumes a thermoformed shape, the shape of each of the second sheets conforms to the shape of the first sheet, and the sheets do not fuse in the portion of the overlapping region. In this embodiment, each of the second sheets can have different, identical, or substantially the same composition. Likewise, the compositions of the first sheet and any or all of the second sheets can be different, identical, or substantially the same.

In an important embodiment, at least one of the second sheets bears perforations therethrough, such that material that is contained within the perforated second sheet when it is peeled from the article and that has a size, fluidity, deformability, or compressibility sufficient to permit the material to pass through the perforations can pass or be urged through the perforations upon peeling of the sheet from the article. The perforated second sheet can bear perforations arranged randomly about the sheet, perforations that are arranged in a uniform pattern across the entire sheet, perforations that occur only within a selected region of the sheet (e.g., the central portion thereof), or any combination of these. The size, shape, density, and arrangement of the perforations is not critical, other than that these factors should be selected such that the perforated second sheet will exhibit sufficient cohesion under the conditions of anticipated use that it does not rupture under those conditions (unless a rupturable second sheet is desired, such as in an embodiment in which passage of liquid or small particles through the perforated second sheet is desired prior to rupturing the perforated second sheet to recover relatively large items retained therein or thereon).

As with the first barrier composition, the second barrier composition can include an adhesive (i.e., the same adhesive as the first or a different adhesive). The second barrier composition peelably adheres adjacent second sheets. An article made by thermoforming a stack of this sort will have multiple peelable layers. Such articles are desirable when, for example, a renewably clean surface is required of an article, and particularly in situations in which cleaning of the surface is difficult, time-consuming, distasteful, or hazardous. In one embodiment, an article having a relatively thick (e.g., 10 to 40 mils) base (substrate) layer made from a thermoformed polymer can have multiple thin (e.g., 1 to 7 mils) peelable layers that are separately, peelably adhered to the base. The base can provide shape and rigidity to the article (e.g., a paint tray or a toilet seat), and the peelable layers can provide a renewably clean surface upon peeling of individual layers.

The stack described herein has at least one second sheet on at least one face of the first sheet, as described above. Multiple second sheets can be arranged on the first sheet, adjacent one another, at a distance from one another, overlapping one another, or any combination of these. The second sheets can be stacked atop one another, with the edges of the stacked second sheets coinciding perfectly or nearly perfectly with one another, with the edges of each stacked second sheet completely covering one or more edges of the sheet over which it is stacked, with the edges of each stacked sheet receded away from one or more edges of the sheet over which it is stacked, or any combination of these. Furthermore, second sheets can be arranged on one or both faces of the first sheet. On each face of the first sheet, there can be a single second sheet, multiple non-overlapping second sheets, multiple partially-overlapping second sheets, or multiple stacked second sheets.

Stacks including one or more perforated second sheets can be made by incorporating into the stack sheets that are already perforated (e.g., a "web" sheet having regularly-spaced circular holes arranged across substantially the entire sheet). Alternatively, one or more second sheets can be perforated by subjecting the assembled stack to a perforating or cutting operation prior to, during, or after thermoforming the stack. A wide variety of methods for perforating some or all sheets in a polymer stack are known, and substantially any of these can be selected by a skilled artisan, depending on the nature of the desired perforations.

When tabs are interposed between adjacent sheets, at least a portion of the tab should extend beyond an edge of one of the adjacent sheets, to facilitate grasping of the tab. If an adhesive is interposed between the adjacent sheets, the tab can facilitate peeling of the adjacent sheets, particularly if the adhesive completely fills the gap (i.e., all the way to the edges of the sheets) between the adjacent sheets. If no adhesive is interposed between the adjacent sheets, the tab can nonetheless facilitate separation of the adjacent sheets by relieving any pressure between the inter-sheet gap, by providing a region in which electrostatic forces between the sheet surfaces are disrupted, or simply by providing a mechanical lever by which expansion of the inter-sheet gap can be initiated. In an advantageous embodiment, tabs are interposed between sheets in such a manner that the tabs between sheets alternate between one side of the shaped article (or stack) and the other side, for example so that peeling a sheet using a tab interposed between the top sheet and the next (i.e., underlying) sheet on the right side of the shaped article exposes a tab interposed between the next sheet and the third sheet on the left side of the shaped article. (See, e.g., FIG. 11.) Particularly when stack materials are provided in rolled form, it can be advantageous to have the tabs arranged symmetrically along the sides of the rolls, so that the rolled stack material has approximately the same size at both ends of the roll.

The stack described herein can be prepared and provided in the form of multi-sheet leaves, folded bundles, or rolls, for example. In many polymer-processing operations, rolls of polymeric materials are preferred for ease of handling. Rolls of the stack described herein can be prepared simply by winding the stack about itself, or about a core such as a paper or wooden tube or cylinder, in a rotary fashion. In order to minimize unintended interactions between the bottom of the stack in one layer of the roll and the top of the stack in an adjacent layer of the roll, a release agent can be interposed between layers of stack as it is rolled. In one embodiment, the release agent is a sheet of a material such as paper or waxed paper. In another embodiment, the release agent is an oil or other liquid agent which inhibits or prevents irreversible interaction of stack layers. By way of example, a thin film of a silicone-based compound (e.g., a liquid polysiloxane-containing composition, such as a silicone oil) can be applied to the top, bottom, or both top and bottom of the stack as it is rolled. The release agent should either be an agent which does not affect thermoforming operations on the stack or an agent which can be separated from the stack prior to thermoforming operations.

Images, text, designs, or other printed matter can be included on one or more of the sheets of the stack and articles made by thermoforming the stack. By way of example, label text and graphics can be printed on the outermost second sheet (i.e., the second sheet on the "top" of the stack, having no other second sheets atop it). Such label information can be printed on the exterior of the sheet (i.e., on the surface of the product) or, if the outermost second sheet is not opaque, the information can be printed on the inner surface (i.e., first-sheet-side) of that sheet. Such printed matter should encapsulated between the sheet and the barrier composition that is interposed between the outermost sheet and the adjacent sheet. Encapsulation of the printed matter can ensure that the printed matter is peeled off with the outermost sheet (i.e., does not adhere to the adjacent sheet) when the outermost sheet is peeled away from the adjacent sheet. Printed matter can be applied to the inner and/or outer faces of any of the sheets described herein in the same manner. Judicious selection of surface treatments (e.g., Corona treatment) and adjacent adhesives can ensure that the printed matter remains bound to a desired surface when the adjacent adhesive (and any polymeric or other sheet adhered to the desired surface by the adhesive) is peeled away.

When printed matter is included on a surface of the shaped articles described herein, the precise materials and methods used to print the matter on the surface are not critical, other than that they should be selected such that the printed matter will remain attached to the surface to which it is applied during normal use of the shaped article (unless detachment of the printed matter is considered acceptable). By way of example, in one embodiment of the thermoformed, multiple-peelable-layer paint tray disclosed herein, the outermost peelable layer is transparent and the printed matter is applied to the underside of that layer (i.e., the face of the layer that is adhered to the underlying surface) such that an adhesive in the barrier composition between that layer and the underlying surface adheres to the printed matter (and thence to the outermost layer) when the outermost layer is peeled away from the underlying surface. In another embodiment, the penultimate peelable layer (i.e., the second sheet adjacent the first sheet) is transparent and the printed matter (e.g., text reading, "This is the final peelable layer!") is applied to the underside of that layer (i.e., the face of the layer that is adhered to the surface of the first sheet) such that the printed matter is removed, together with any adhesive present in the first barrier composition, when the penultimate peelable layer is peeled away from the first sheet.

Included in embodiments of this disclosure are shaped articles that include multiple, substantially identically-shaped sheets of thermoformable polymers that overlap at an overlapping region. Interposed between each pair of sheets, in at least a portion of the overlapping region, is a layer of a barrier composition. Because the barrier composition prevents the sheets from fusing across their entire faces (i.e., the sheets do not fuse at the portions of the overlapping region at which the barrier composition is present when the sheets are thermoformed) the article is separable into multiple, substantially identically-shaped subarticles upon separation of the sheets. The barrier composition can be omitted from at least a portion of the gap at the overlapping portion of the sheets in order to form an article in which the substantially identically-shaped subarticles remain bound together at the overlapping portion that lacked the barrier composition during thermoforming. Alternatively, that portion of the gap can be filled with an adhesive to (reversibly or irreversibly) bind the overlapping portions corresponding to the sub-articles. Such bundles of subarticles can often be stored, shipped, handled, manufactured, and used more conveniently and more energy-efficiently than an equivalent number of separate subarticles, and the subarticles can be separated from one another at a convenient time and place simply by breaking, cutting, or otherwise separated from the bound overlapping portion. Such an article can include multiple (e.g., 2, 6, 10, or 20) discrete egg cartons, cookie trays, cups, blister packs, computer keyboard covers, or paint tray liners that can be separated from one another as desired.

The subject matter described in this disclosure includes a shaped article that includes a shaped thermoformable polymer sheet, a plurality of second polymer sheets, and first and second barrier compositions. The second sheets overlap the thermoformable sheet at an overlapping region and conform to the shape of the thermoformable sheet at substantially the entire overlapping region. The first barrier composition is interposed between and peelably adheres the thermoformable sheet and the adjacent second sheet. The second barrier composition is interposed between and peelably adheres adjacent second sheets. In an article of this type, the second sheets are peelably removable from the article. The article can include tabs interposed between adjacent second sheets and a tab between the thermoformable sheet and the adjacent second sheet. By way of example, the shaped article can be an animal litter tray having peelable, perforated liner layers, as described herein.

Animal Litter Trays

The containers described herein can be used as litter trays for animals (typically pets) such as cats, rabbits, rodents, birds, snakes, and lizards.

In conventional animal litter trays, a particulate material is contained within a concave portion of a container, such as a tray or box. An animal is provided access to the concave portion, and thence the litter, by way of an opening in the tray or box. Generally, for tray-shaped litter trays (e.g., round, rectangular, or triangular trays, with or without lips about their outer edge), most or all of the upper portion of the tray is accessible entry by the animal. For box-type litter trays, the tray has the conformation of a hollow geometric shape (typically a generally elongated cubical box, sphere, or hemisphere for cats, for example) and entry is generally by way of one or more ports positioned and sized to permit the animal access to the litter. Many litter trays include other features, such as handles for manipulating the tray, ventilation ports or filters, odor absorbent receptacles, latches or fittings for connecting parts of the tray, or apparatus for combing, scooping, or filtering the litter. Trays can be made from any material, but are most commonly made from various plastics. Materials of construction are typically selected based on their appearance (i.e., acceptable as objects visible in residential living space) and their moisture- and odor-resistance.

Litter materials used within animal litter trays are typically selected for their ability to absorb and contain liquid and odor. Typical litter materials are an absorbent clays, silica-based gels, and recycled plant products (e.g., paper, wood sawdust, or ground citrus fruit rinds).

Absorbent clays are favored on account of their relative inexpense, their absorbance, and the fact that they can be manufactured with controlled particle sizes (i.e., particles sufficiently large to inhibit inadvertent disbursement of the litter material by adherence to the animal using the material are preferred). Absorbent clay particles absorb liquid, such as animal urine, and sequester it within the particles. Certain absorbent clays (e.g., bentonite clays) are particularly preferred on account of their "clumping" behavior upon exposure to liquids and have become commercially preferred by may animal owners. Upon contact with liquid, particles of clumping clay increase in size, bind with other particles, or both. As a result, urination into a bed of clumping clay particles tends to produce a bolus or clump of material that can be distinguished and separated from free-flowing particulate material that has not been exposed to liquid.

Silica gels, like absorbent clays, tend to absorb liquids such as animal urine and sequester it within gel particles. Because the liquid-sequestration capacity of silica-based gels tends to greatly exceed the capacity of absorbent clays, silica gel litters are preferred by some animal litter users. Silica gels also tend to strongly sequester urine-related odors, but generally do not clump unless combined with clumping clay materials.

Virgin or recycled plant products such as sawdust, recycled paper pellets, wheat or corn chaff, and the like are preferred by some animal litter users. These materials tend to be biodegradable and make use of recycled materials that would otherwise be discarded as wastes. The absorbency and clumping behavior of plant product litter materials depend strongly on the identity of the material and how it has been processed, but tend to be lower than those of absorbent clays and silica gels (with the exception of certain saw dusts and wood flours, some of which are highly absorbent and clump readily upon exposure to liquid.)

Regardless of the identity of the litter material they contain, animal litter trays are used by providing to an animal access to the tray in a time, manner, and place at which the animal defecates or urinates into or onto the litter material contained within the tray. After an animal has defecated, urinated, or both, in the litter material, the litter can be used again.

Used litter is often tolerated by animals and by human litter tray users, at least so long as the litter remains accessible access to the litter is not obscured by feces), remains absorbent the litter is not saturated with liquid), and does not exhibit intensely disagreeable odor.

Because feces both obscure litter beneath them and tend to exude disagreeable odor, it is often desired to remove feces from otherwise reusable litter. Similarly, it can be desirable to remove urine from used litter, especially if the litter does not tightly sequester urine-related odors. Because feces and boluses of clumped urine tend to be larger than particles of litter materials, they are often segregated from litter by passing the litter-feces composition through a perforated article such as a screen, a slotted spoon or shovel, or a comb or rake. The perforations permit passage of relatively small litter particles, while retaining larger items such as feces and boluses of clumped urine. However, many human users of animal litter trays consider sifting feces and clumped urine from used animal litter to be unpleasant, distasteful, or both. Furthermore, articles used to sift feces and clumps from used litters tend to become soiled and smelly. For these reasons, many animal owners and handlers tend to dread removing objects from animal litter trays and instead discard the entire tray contents (i.e., including litter that remains suitable for reuse).

A further disadvantage of previous clumping animal litters pertains to how such litters interact with animal litter trays and how clumped litter must be removed from such trays. Clumping litters tend to form relatively solid, but nonetheless relatively brittle, masses. Because many animals tend to bury their urine and excrement in free-flowing litter, the locations of urine bolus clumps is often unclear to the human user. Furthermore, owing to the effects of gravity and the proclivities of individual animals, urine bolus clumps sometimes occur along the bottom of a litter tray, or along the sides or corners adjacent the flat bottom portion of a litter tray. Clumps of urine that form at a surface of a litter tray can tend to adhere to that surface, especially if permitted to dry while in contact with the surface. Unless the implement used to sift the clumps from free-flowing litter closely conforms to the shape of the litter tray, the implement can break up clumps adhered to the surface of the tray, creating "crumbs" or small particles that will not be retained by the sifting implement. The subject matter described herein has the significant advantage that the surface against which a clump may be situated applies pressure to the clump (except where the clump may overlie a perforation), thereby reducing the likelihood of crumb formation.

The animal litter container (also referred to as an animal litter tray) described herein includes a substrate that has a concave interior surface and at least one, but preferably a plurality of, perforated peelable liner sheets. The sheet adjacent the substrate is termed the bottom sheet, although it can be substantially identical to the other liner sheets. Each liner sheet conforms to a substantial portion of the interior surface. For ease of reference, each liner sheet is said to have a lower surface and an upper surface. The lower surface of each sheet other than the bottom sheet is releasably (preferably peelably) adhered to the upper surface of the underlying sheet, such as with a peelable adhesive on substantially the entire lower surface of the sheet. The lower surface of the bottom sheet is releasably adhered to the interior surface, again such as with a peelable adhesive on substantially the entire lower surface of the bottom sheet. At least one of the liner sheets has perforations that are dimensioned such that ordinary animal feces, ordinary-sized boluses of animal urine, or both are unable to pass therethrough; however unsoiled animal litter can pass through the perforations.

The tray described herein is used by peeling a liner sheet from the tray, permitting any free-flowing materials that will pass through the perforations to do so, and then separating the materials retained on the peeled liner sheet and the remainder of the tray. In this manner, those materials incapable of passing through the perforations can be effectively sifted from the free-flowing litter. The materials thereby separated from the free-flowing litter can be discarded, composted, or otherwise disposed of. If desired, the peeled liner sheet can be cleaned and recycled or incinerated to generate heat for power generation, for example.

In one embodiment, the animal litter tray has substantially the same appearance as a known animal litter tray, but has its concave, litter-containing portion covered, or partially covered, with at least one perforated, peelable liner sheet (preferably multiple such sheets). The tray can be used identically as the known tray, except that fecal and clumped materials can be segregated from free-flowing litter by peeling a liner sheet therefrom as described herein. Thus, the trays described herein can be used in place of substantially any known animal litter tray.

In a preferred embodiment, the tray is rectangular in its overall appearance (i.e., it has the general appearance of a elongated cube truncated parallel to a side thereof), has sloped walls (i.e., as in a truncated cube in which the open end has been stretched outwardly such that the side walls form an obtuse angle with the intact face), rounded corners (i.e., the corners between the sidewalls are rounded, and the corners between each side wall and the intact face are rounded), a lip or flange surrounding the open end, and a depth sufficient to contain an amount of litter that is appropriate for use by the animal for which the tray is intended. In the case of a litter tray intended for use with domestic housecats, for example, the dimensions of the tray substrate can be about three feet long and two feet wide at its open end, with a one-inch-wide rounded flange circumscribing the open end (with the curvature of the flange being convex when viewed from beyond the open end of the tray), a closed end having dimensions about 30 inches long and 20 inches wide, sloped sidewalls extending between the open end and the closed end and surrounding a flat central portion at the closed end, and all corners being rounded consistent with a thermoformable shape (i.e., corners generally having a radius of curvature not less than about ½ inch). The substrate is a thermoformable plastic having rigidity and strength sufficient to withstand ingress and egress of a housecat without tearing or rupturing. Peelably adhered to the substrate across its entire concave face and extending onto the flange surrounding the open end is a perforated liner sheet. The perforated liner sheet conforms to the surface of substrate across the entire interior surface thereof. Perforations in the liner sheet are in the form of round holes having a diameter of about ⅜ inch each, and a few hundred perforations are present in the liner sheet, all of the perforation being present in the flat central portion of the closed end of the tray. The liner sheet is peelable from the substrate and has sufficient strength and rigidity that the amount of litter that will ordinarily be present in the tray (e.g., the area of the central portion multiplied by the depth of litter that will be ordinarily present, such as not more than one, two, or three inches). Preferably, a stack of additional liner sheets (each peelably adhered to the sheet above and below it) is peelably adhered to the first liner sheet, and each of the liner sheets in the stack also contains perforations, preferably coinciding in number, size, and location with the number, size, and location of the perforations through the liner sheet adjacent the substrate.

As illustrated in an exploded view in FIG. 17, the tray can include a pair of trays 201 described herein and a removable connector 203 for maintaining the pair of trays 201 a selected distance from one another and in an inverted (relative to each other) configuration. Each tray 201 has a lip or flange 205 surrounding the open end thereof and, in this embodiment, the flanges 205 include holes or fixtures 204 for connecting the connector 203 thereto. The connector 203 can have connectors or fittings 206 for connecting the connector 203 to the lip or flange 205. When assembled, the pair of trays 201 and the connector 203 have the overall appearance of an elongated cube having an opening 210 in one side, the opening 210 defined by the edges of the trays 201 and the connector 203. The connector 203 can be substantially any material and can be a single part or multiple parts. The connector serves to maintain the trays 201 in a selected, preferably fixed, configuration relative to one another. When one or more connectors 203 are used which inhibit passage of an animal between the two trays 201 at the position of the connector 203, the connectors 203 can also serve as "walls" of a litter receptacle, affording privacy to the animal, preventing scattering of litter from the tray 201, or both.

Other Containers for Segregating Items by Size

Described herein are containers for segregating relatively large feces and clumped boluses of urine and clumping animal litter from relatively small particles of animal litter. Analogous containers can be made for separating other groups of articles that differ substantially by size or other characteristics that would affect an article's ability to pass through perforations in a peelable liner sheet. By way of example, particulate materials are often fractionated by size using screens having openings of well-defined size. In operation, this screening procedure involves depositing the mixed particulate materials atop the screen and thereafter shaking or vibrating the screen to permit particles to pass through the screen. Particles that pass through the screen can be discarded or collected in a container, as can particles that are unable to pass through the screen. Based on this same principle, a container can be made as described herein wherein a perforated liner sheet is peelably attached to the interior surface of a container. A mixture of particles or other items can be placed within the interior of the container. At a desired time, the liner can be peeled from the interior surface, being careful not to permit any particles to exit the liner other than through the perforations therein. By holding the liner in a configuration that permits particles to pass through the perforations under the influence of gravity (or, optionally, upon shaking or vibration of the peeled liner), those particles can be retained within the container and particles unable to pass through the perforations can be removed from the container. A significant advantage of such a container, relative to known screening and filtering procedures is that the container acts as a unitary device until and unless the liner is peeled from its interior surface. Thus, unlike prior screening methods that require two separate articles to effect size segregation, only the container described herein is required, and the size-segregating facility of the container remains latent until activated by a user.

Further details of the materials and methods suitable for use in the articles, methods, and compositions described herein are provided in the ensuing sections of this disclosure.

Thermoformable Polymer Sheets

The identity and composition of thermoformable polymer sheets used in the articles and methods described herein are not critical. A skilled artisan will recognize that substantially any thermoformable polymeric material can be used. Examples of suitable thermoformable polymeric materials include polyethylene terephthalates, polyesters, polyethylenes (e.g., high density polyethylenes and high molecular weight polyethylenes), polypropylenes, polyvinylchlorides, polystyrenes, nylons, copolymers of these, and combinations of these. Plant-based polymers, such as polylactates (also known as "lactic acid polymers" and PLAs) can also be used.

A skilled artisan can select a thermoformable polymeric material, or combinations of such materials, suitable for use in substantially any application by considering such properties as the shrink rate, crystallinity, heat deflection temperature, tear strength, draw ratio, thickness, rigidity, melt temperature, thermal conductivity, and polymer backbone orientation of the materials. Selection of materials can also be guided by properties that do not necessarily directly impact the thermoformability of the materials, such as cost, color, opacity, recycled material content, environmental impact, surface energy, chemical resistance, and surface sheen of the materials.

In selecting appropriate materials, an artisan should consider at least two sets of conditions: the environmental conditions to which the finished, shaped article will be subjected and the conditions that the materials will experience during the thermoforming process. Materials should be selected so as to exhibit the desired color, shape, strength, rigidity, and peelability, for example, once the materials have been shaped in the thermoforming process into their final, desired form. The materials should also be selected, together with the thermoforming conditions, so as to allow assembly and shaping of the materials into their final, desired form using thermoforming conditions available to the artisan.

Peelable Polymer Sheets

The identity and composition of peelable polymer sheets used in the articles and methods described herein are not critical. A skilled artisan will recognize that substantially any peelable polymeric material can be used. Examples of suitable materials include polyethylenes, polypropylenes, polyethylene terephthalates, nylons, polyvinyl chlorides, copolymers of these, and combinations of these. Plant-based polymers, such as polylactates (also known as "lactic acid polymers" and PLAs) can also be used. Where contact with liquid is anticipated (as in the animal litter containers described herein), the peelable polymer sheet should be selected to be substantially impervious to the liquid.

In some embodiments, peelable sheets preferably have sufficient structural integrity that they do not tear or significantly stretch when subjected to forces necessary to peel them from surfaces to which they are adhered with a peelable adhesive. Peelable sheets should also exhibit sufficient strength and rigidity to support any materials which will be foreseeably carried by them immediately after peeling. For example, in the animal litter container described herein, it can be expected that immediately after peeling the uppermost liner from the substrate, the liner will contain both most of the litter and any feces or clumped urine boluses that were present in the litter. Most or all of the free-flowing litter that can pass through the (perforations in the liner can be expected to pass therethrough. Nonetheless, in order to prevent tearing of the liner during or immediately after peeling, its materials and construction should be selected such that it can withstand forces endured by an anticipatable amount of litter, feces, and urine without rupturing.

The peelable sheets are preferably thin and highly flexible. Sheets having a thickness in excess of 8 mils can be difficult to peel, and so sheets thicker than that are not preferred. The peelable sheets can be made from substantially any polymeric material(s) and by substantially any sheet-forming process. By way of example, suitable polymer sheets can be made by blowing, molding, casting, or extruding suitable polymer materials, or by some combination of these processes. When made of thermoformable materials, the peelable sheets are preferably thermoformed simultaneously with the substrate sheet of thermoformable material to which they are adhered. When made of non-thermoformable materials, the peelable sheets should be capable of maintaining their structural integrity at a thermoforming conditions at which the substrate sheet to which they are adhered is thermoformable.

Peelable sheets can be selected to be rigid (i.e., retain their shape after peeling, e.g., akin to prior art molded paint tray liners that can be lifted out of a paint tray and retain their shape when subjected to small forces) or substantially non-rigid (e.g., blown polymeric sheets such as the material used in trash can liners and trash bags).

The peelable nature of an individual peelable sheet can derive from surface attraction between the peelable sheet and the surface underlying it. Preferably, however, an adhesive is interposed between the sheet and the surface and the peelable nature of the sheet derives primarily from the adhesive forces exerted by the adhesive upon the sheet and the surface. An adhesive can be selected (e.g., based on the chemical identity or the surface treatment of the peelable sheet or the surface to which it is adhered) so that, upon peeling of the peelable sheet, the adhesive preferentially remains adhered to the peelable sheet, or to the surface. For instance, when the function of the peelable sheet is to expose the surface free of adhesive and other contaminants, the adhesive can be selected so that it both adheres the peelable sheet and the surface and adheres more strongly (i.e., more tenaciously) to the peelable sheet so that, upon peeling, the adhesive is removed from the surface along with the peelable sheet.

Differences in the tenacity with which an adhesive binds the opposed surfaces of two polymer sheets can be controlled in a number of ways, including by coating one or more portions of one surface with a composition that inhibits binding of the adhesive to the surface. Preferably, however, differences in the tenacity of adhesive-binding are controlled by selecting or treating the polymer sheets such that their opposed surfaces exhibit a difference in surface energies. If the difference between the surface energies of the two surfaces is relatively large—at least 5 Dynes—then the adhesive will bind significantly more tenaciously to one surface than the other. As the difference in surface energies of the two surfaces increases beyond 5 Dyes, the likelihood that all of the adhesive will remain with one sheet when the two sheets are separated increases. A difference of 5 to 14 Dynes between the adhered surfaces of the two sheets is considered appropriate.

It may be possible to separate two surfaces having an adhesive interposed between them, even if the surface energies of the surfaces differ by less than 5 Dynes. In this situation, the adhesive may adhere to each of the two surfaces with roughly equal tenacity, meaning that the adhesive may adhere to both surfaces (at various portions) after the two surfaces are separated from one another. In many applications, it is desirable to have most or all of the adhesive to adhere to the surface of only a single one of the polymer sheets (usually the one being peeled away from the remaining sheets or substrate). For such applications, the two surfaces contacted by the adhesive should preferably have surface energies that differ by at least 5 Dynes.

The amount of force needed to separate peelable sheets from their underlying surface is not critical, but is preferably sufficiently small to prevent tearing and substantial stretching of the peelable sheet upon manual peeling of the sheet from the surface. The amount of separation force needed is a function of the materials selected for the peelable sheets, the underlying surface, and any barrier composition or adhesive interposed between them. Practically speaking, the tenacity of adhesion between a peelable sheet and the underlying surface should be selected so that the sheet can be peeled away from the surface using normal human strength, but not so tenacious that the sheet must be torn or punctured by a person peeling the sheet from the surface. A skilled artisan recognizes that the numerous variables (e.g., the angle at which the sheet is pulled from the surface, whether fingernails are applied to the sheet surface, the speed with which the sheet is peeled, the temperature of the shaped article at the time of peeling) can attest the peeling characteristics of the sheet, and the materials described herein include all materials that are operable under the ambient conditions corresponding to anticipated uses of the materials and shaped articles.

To the extent that an objective measure of the force needed to peel a sheet from an underlying substrate surface is desired, a standardized test of peel strength can be used. An example of a suitable test is ASTM D3330/D3330M, which is a standardized test for peel adhesion of pressure-sensitive tape. A modification of this procedure (e.g., substituting a sheet of the substrate material in place of the standard steel sheet in ASTM D3330/D3330M and selecting a peel angle appropriate for the intended use of the shaped article being tested) can also be used. In each case, the characteristics of the shaped article or stack should be selected such that the peel strength of the finished article is within the limits of human strength.

Various Surface Treatments and Polymer Sheet Ingredients can be Used to Affect the Surface Energy In one embodiment of the stack and shaped articles described herein, multiple adjacent polymer sheets are made of the same material. Unless treated non-identically, the two faces of a polymer sheet will normally have the same surface energy. Therefore, in stacks and articles which include multiple identical polymer sheets, it is important that the two Laces of the identical polymer sheets be treated differently, so as to yield a polymer sheet having different surface energy values for each of its two faces. Such sheets are preferably treated such that the surface energies of their faces differ by 5 Dynes or more. Many compositions and methods for affecting the surface energy of polymer sheets are known to skilled artisans in this field, and substantially any of those methods may be employed. Such methods include conventional surface finishing techniques such as grinding and polishing, annealing processes, Corona treatment, and plasma contact techniques such as atmospheric, chemical, and flame plasma techniques. Compositions for affecting the surface energy of a surface of a polymer sheet are also well known, and include compounds that can be contacted or reacted with the surface to modify its chemical or physical properties (affecting its surface energy).

An example of a suitable surface treatment is the process known as Corona treatment or Corona discharge treatment, which involves application to a surface of a high-frequency, high voltage electrical discharge. Corona treatment raises the surface energy of a polymeric surface. Applied to one face of a polymer sheet having two otherwise identical faces, Corona treatment will raise the surface energy of the face, relative to the opposite face of the sheet. The power applied in a Corona treatment can be controlled to limit the treatment substantially to one side of a sheet. At very high power, the treatment can raise the surface energy of both faces of the same sheet which, in the absence of other surface treatments, will not yield a polymer sheet having different surface energies on its two faces. If a polymer sheet is Corona treated at or near the time it is formed, the surface energy-raising effects of the treatment can endure for weeks, months, or years. If the sheet is Corona treated days, weeks, or later after the sheet is made, the surface energy-raising effects of the treatment can be more transitory (e.g., enduring only for days or weeks). Polymer sheets that are Corona treated at or very near the time they are formed can be used in the stacks and articles described herein. Polymer sheets can also be "bump-treated" (i.e., be Corona treated regardless of how long it has been since the sheet was formed) shortly before making the stacks and articles described herein.

Barrier Compositions

The identity and composition of barrier compositions interposed between polymer sheets used in the articles and methods described herein are not critical. A skilled artisan will recognize that substantially any material can be used as a barrier composition between two polymers, so long as it substantially prevents fusion of two polymers under conditions at which at least one of the polymers can be thermoformed. A wide variety of such compositions are known for this purpose.

Examples of suitable barrier compositions include adhesives (e.g., peelable adhesives such as pressure-sensitive adhesives), known polymer release agents, a polymeric or paper film interposed between polymer layers, and various liquids, including low-viscosity silicone oils.

A composition interposed between two surfaces (e.g., between the first and second polymer sheets, or between two second polymer sheets, as described herein) can act as a barrier composition between the two surfaces if the composition coats at least one of the two surfaces at a thermoforming condition, thereby preventing surface-to-surface contact and fusion of the two surfaces at the thermoforming condition.

A barrier composition prevents fusion of opposed polymeric surfaces only when it is interposed between the surfaces at the thermoforming condition. For that reason, the barrier composition must be interposed between the surfaces over the entire area for which fusion between the surfaces is not desired. This can be achieved in various ways, including use of liquid and solid barrier compositions. When a stack is to be thermoformed to make a plurality of shaped objects that are not fused over some portions, but fused at at least one portion (e.g., a stack of cookie trays fused only at a single, frangible extension of the trays at one corner), the barrier composition is interposed among the polymer sheets in the non-fused areas, but is not interposed between the polymer sheets in the area in which fusion is desired.

Liquid barrier compositions should be selected such that they completely coat (i.e., wet) at least one of the surfaces over the entire area for which fusion is not desired. This can be achieved by selecting a liquid barrier composition (i.e., a composition that is a liquid at at least the thermoforming condition, regardless of whether it is a liquid at which it is contacted with the surface) that has a surface tension significantly greater (i.e., at least 2 Dynes, and preferably at least 10 Dynes greater) than the surface energy of the surface with which it is contacted. This surface energy difference should ensure that the liquid barrier composition completely wets (i.e., coats) the area of the surface for which fusion is not desired. Preferably, the liquid barrier composition has a surface tension significantly greater than the surface energy of both surfaces, so that the liquid is not displaced from between the surfaces at points at which the two surfaces are urged tightly against one another.

Solid barrier compositions (e.g., polymer sheets) should be selected so that the solid covers the entire area for which fusion is not desired. The identity of the solid is not critical, so long as it does not prevent the portions of a polymer sheet that are to be thermoformed from reaching the thermoforming condition. Solid barrier compositions can prevent fusion of the surfaces (and/or) fail to fuse to one or both surfaces for a variety of reasons, any of which are sufficient to render a material suitable as a solid barrier composition. Some solids can be predicted to act as suitable barrier compositions, while other may require empirical testing (e.g., thermoforming two sheets of the polymer with the solid interposed between them) in order to determine their suitability. Either way, selection of an appropriate solid barrier composition is within the ken of a skilled artisan in this field.

Another type of barrier composition that can be used is a composition incorporated as an additive into one or both of the polymer sheets. These compositions melt and "bloom" to the surface of a polymer when heated, pressed, stretched, or otherwise manipulated, if such a composition is included in one or both of the polymer sheets such that the composition blooms at the surface of at least one sheet at the thermoforming condition and prevents contact between the polymer sheets themselves, then the composition can be used as a barrier composition in the articles and methods described herein. A wide variety of compositions that exhibit such blooming behavior are known in the art.

Adhesives

The identity and composition of adhesive interposed between polymer sheets used in the articles and methods described herein are not critical. A skilled artisan will recognize that substantially any material can be used as an adhesive between two polymers, so long as it reversibly binds the two polymer layers and requires no more force to separate the polymer layers than can be practically applied to the polymer layers by a person of ordinary strength. A wide variety of such compositions are known for this purpose.

The adhesives used between a peelable polymer sheet and an underlying surface are preferably peelable, meaning that the polymer sheet can be peeled from the surface by a person of ordinary strength, preferably without tearing or substantially stretching the sheet. Preferably, an adhesive having a coat weight of roughly 0.6 to 15 ounces per inch is used to adhere a peelable sheet to an underlying surface.

A wide variety of suitable adhesives are known in the art and can be used as described herein. Pressure-sensitive adhesives are among the suitable adhesives that can be used. Likewise, adhesives that adhere preferentially to one of two adhered surfaces, upon peeling of one of the surfaces away from the other) are suitable and are preferred in certain embodiments. By way of example, if an adhesive adheres more strongly to a peelable polymer sheet than to a surface to which the sheet is adhered by the adhesive, the adhesive will tend to remain with the sheet when it is peeled from the surface.

Various compounds and surface treatments can be used to reduce the force needed to pull an adhesive from a surface, and such compounds and treatments can be used to modulate adhesion of an adhesive to a surface described herein.

Specific examples of adhesives that can be used in the articles described herein include polysiloxane-based adhesives, rubber cement, and acrylic adhesives (e.g., waterborne pressure-sensitive, acrylic adhesives of the MULTI-LOK brand family of acrylic adhesives manufactured by National Adhesives of Bridgewater, N.J.).

Printing

Text, images, or other graphical material can be printed onto one or more faces of one or more of the polymer sheets described herein. A wide variety of materials and methods can be used to print such material onto the surface of a polymer sheet. A difficulty inherent in printing on polymer materials is that the printed matter can often easily be displaced from the polymer surface by heat, light, or mechanical abrasion, leading to reduced print quality. Furthermore, it can be undesirable for the materials used for printing to contact materials that will be in contact with the polymer. For example, it can be undesirable to have printing inks contact paint on the interior surface of a paint tray. These effects can be avoided by applying a clear polymer sheet or layer over top of the printed matter, thereby securing it in place and preventing its displacement. However, the clear layer often cannot be peeled off without severely damaging the printed matter and/or leaving portions of the printed matter on the peeled sheet and the underlying surface.

In one embodiment of the stacks and shaped articles described herein, printed matter is incorporated between polymer sheets and is peelable coherently with one sheet. In this embodiment, the printed matter is printed (preferably "reverse" printed, in that the printed matter is intended to be viewed through the sheet, rather than by viewing the printed surface of the sheet) onto the face of a clear (or at least translucent or not-completely-opaque) polymer sheet, and that face of the clear sheet is adhered to an underlying sheet. The tenacity with which the printed matter clings to the clear sheet and the tenacity to which adhesive overlying the printed matter clings to the printed matter (and thence to the clear sheet) is greater than the tenacity with which the adhesive overlying the printed matter adheres to the underlying sheet. Thus, when the clear sheet is peeled away from the underlying sheet, the printed matter (and the adhesive overlying it) come away with the clear sheet, leaving the underlying surface free of adhesive and/or printed matter.

The tenacity of binding of printed matter to a polymer sheet can, as described herein for adhesives, be affected by surface treatment of the polymer sheet prior to printing upon it. Corona treatment and plasma discharge techniques, for example, can raise the surface energy of a polymer surface, rendering it susceptible to more tenacious binding by the printed matter. Likewise, surface treatment (e.g., Corona treatment) of a polymer surface having printed matter thereon can raise the surface energy of the surface (including the portion on which the printed matter appears). By applying to the printed portion of the surface an adhesive that adheres more tenaciously to the printed portion than to the opposed underlying surface, adhesion of the adhesive with the printed matter can be maintained upon peeling of the sheet carrying the printed matter from the underlying surface.

In another embodiment, a release agent can be interposed between adhesive contacting a sheet having printed matter carried thereon and an opposed surface. The release agent overlies the printed matter and prevents (or weakens) binding between the adhesive that contacts that printed matter and the portion of the opposed surface that is adjacent the printed matter on the sheet. When the sheet is peeled from the surface, the poor (or lack of) adhesion between the sheet and the surface in the region where the printed matter occurs prevents damage to the printed matter, which is peeled off with the sheet.

Thermoforming Apparatus and Conditions

The articles described herein can be made using known thermoforming apparatus and conditions. Of course, the apparatus and conditions should be selected based on the identity and the characteristics of the materials to be processed. Selection of appropriate thermoforming conditions, based on the identity(ies) of the materials to be processed is within the ken of a skilled artisan in this field.

Animal Litter Trays and Other Thermoformed Articles Having Peelable, Perforated Liners In one embodiment, the subject matter disclosed herein includes an animal litter tray with a plurality of peelable liners that are simultaneously thermoformed with the tray, with the liners being thermoformed to the shape of the tray interior surface at the same time the tray is formed. As used herein, the term "thermoformed" is intended to encompass various methods of shaping a thermoplastic sheet or stacked sheets by heating the sheet and applying a pressure differential to the opposed side of the sheet to conform the sheet to the shape of a mold surface.

While the subject matter of this disclosure is occasionally described in terms of the preferred embodiment of simultaneously thermoforming a substrate and a plurality of liner sheets or simultaneously thermoforming a plurality of similar thin wall substrates with a release agent/barrier on the inner or bottom surface, it will be understood after reading the disclosure that the subject matter also includes simultaneously forming a substrate and a single liner sheet, and shaping the liner sheets and substrate by other means, e.g., by stamping, injection molding or blow molding. The substrate, while preferably a thermoformable plastic, may also be of other materials, e.g., metals.

In one example of thermoforming known as vacuum molding, a sheet is positioned adjacent a female (or male) mold section and a vacuum is applied to draw the sheet against the mold surface. A male mold section may be pressed against the sheet on the opposite side of the sheet from the female mold section to assist in conforming the sheet to the shape of the female mold section. In other processes, such as pressure forming, the heated sheet is pressed against a male mold section (or, more frequently, into a female mold section), usually with the assistance of a vacuum to conform the sheet to the mold shape.

In a preferred embodiment of the subject matter disclosed herein, a plurality of stacked planar sheets of thin plastic serving as disposable liners ("liner sheets") are positioned on a surface of a planar substrate sheet of a greater thickness to be formed into an animal litter tray. The combination of a stack of liner sheets and a single substrate makes a "tray sheet". The liner sheets will preferably be significantly thinner than the substrate sheet, e.g., the liner sheets may be from about 1 mil to about 6 mils thick, while the substrate sheet may be from about 10 mils to about 40 mils thick or even thicker.

Each liner sheet has an adhesive on its inner or bottom surface to secure the liner sheets to the immediately adjacent sheet, with the innermost or bottom liner sheet being adhered to the top surface of the substrate sheet. Preferably, the adhesive backing is a uniform coating of adhesive over the entire inner surface of the sheets except where tear tabs are located. While applying the adhesive in making the liner sheets, the tabs can be added in line, anywhere in part or whole around the perimeter of where the tray will be formed. This is done by deadening the adhesive. Tabs are applied to each liner sheet to facilitate separation of the sheets. Suitable adhesives will be apparent to one skilled in the art, the requirement being that the adhesive is a peelable adhesive, i.e., an adhesive that will permit separation of one liner sheet from another liner sheet or the substrate without tearing the liner sheet.

The tray sheets can be shipped in either sheet form or roll form. For convenience in shipping, storage, and thermoforming, the tray sheet may be provided to the thermoformer in a continuous roll form ("master pad roll"). The roll can be continuously fed through the thermoformer, with each length of tray sheet being indexed, then thermoformed into a shape, i.e., paint tray. The roll length and width can be as desired. For example, the master pad roll can be 5" to 48" in width. As another example, the master pad roll can be 60" in width.

The combined stack of sheets (tray sheets), is thermoformed as a unit into the shape of the desired product, e.g., an animal litter tray with the liner sheets being on the concave interior surface of the tray. Upon cooling, the tray sheet maintains its thermoformed configuration due to the thickness of the substrate sheet, while the configuration of the liner sheets is assisted by the presence of the adhesive backing.

The mold, and thereby the thermoformed tray system, can be of various shapes. Generally, the resultant tray will have an open-top interior cavity with a substantially flat central floor portion and continuous side walls. The animal litter tray can have an annular flange or lip around the perimeter of its open end, such as to fit with a corresponding lid or other matching part. The tray can have other features or shapes of known animal litter trays.

DESCRIPTIONS OF EMBODIMENTS ILLUSTRATED IN THE DRAWINGS

FIGS. 1-16 were originally prepared to demonstrate articles useable as paint trays and their manufacture and construction. However, the same drawings can be understood in the context of making other containers (e.g., cat litter trays that, like the illustrated paint trays, have peelable liners). The following discussion of the embodiments illustrated in the drawings should be read in that context.

As illustrated in FIGS. 1 and 5, tray sheet 10, comprised of a plurality of liner sheets 12 and a bottom substrate sheet 14, is shipped to the thermoformer as a roll 16.

As illustrated in FIG. 2, tray sheet 10 is pulled via the thermoforming machine from roll 16 and positioned within a thermoforming apparatus comprised of upper and lower heaters 22 and 23 to heat the sheet to a moldable state. While both ovens can be heated simultaneously, they also may need to be adjusted independently of one another. The heated sheet is then pulled further to a position over a vacuum source 24 as illustrated in FIG. 3. A female mold 26 conforming to the desired shape of the tray system is positioned in communication with vacuum source 24, Heated sheet segment 10 is lowered onto mold 26 and a vacuum is drawn on mold 26 with vacuum source 24, shaping sheet segment 10 to the interior contours of mold 26 as shown in FIG. 4. The molded tray system is then cooled and ejected from mold 26, and edge trimmed if desired.

The resultant product is a thermoformed tray system comprised of a substrate sheet in the shape of the desired tray, with a plurality of liner sheets stacked thereon and held in place by adhesive layers, both natural or man made, between the liner sheets and the lowermost liner sheet and the upper surface of the substrate sheet. All sheets are molded into the shape of the desired tray.

A paint tray 30 is illustrated in FIG. 6. Tray 30 is comprised preferably of a horizontal, flat central shelf 32 with ridges 34 to remove excess paint from a paint roller rolled across shelf 32, down ramps 40 and paint wells 36 and 38 on opposite sides of ramps 40. Tear tab 42 can be located anywhere on the perimeter of all liner sheets, or all or part of the entire perimeter of the liner sheet can form a tab 43 for use in separating the liners. An alternative paint tray configuration is illustrated in FIG. 7, showing the addition of feet 44 for added stability. Animal litter trays preferably can have ribs, ridges, multiple compartments separated by ridges, and the like, some or all of which can be covered by the liner sheets.

Various other means may be used to include tabs to facilitate separation of the tapes. For example, as shown in FIG. 8, the layers of liner sheets 50 may be stepped during the converting process where the substrate 52 and liner sheets 50 are formed into a roll. The resulting look will be like steps 54 on the edges, allowing the consumer to see the edges of all the layers.

In another alternative shown in FIG. 9, the liner sheets 60 may be "strip coated" before it is made into the roll form. That is, adhesive is applied to the body of the liner sheets 60, except for the area of the tabs 62. Thus, the liner sheets 60 have adhesive except for the edges (e.g., ½"), either on one side or both sides of the liner sheets. The end result is the edges of the tray will have no adhesive on the "tabs" 62, allowing the consumer to identify and begin peeling the layers.

Yet another alternative as shown in FIG. 10, is to use actual separate tabs 70 on the edges of the liner sheets 72 to distinguish between layers. The separate tabs 70 could be tape/film of plastic or paper (e.g. ¾" wide, with or without adhesive) to be applied on the ends of the protective tape on either the top or bottom preferably the bottom (this side of the protective tape has the adhesive). This tape/film could be of various colors and designs and will serve as an aid for the consumer to pull apart the layers of liner sheets 72.

Yet another alternative is shown in FIG. 22, using actual separate tabs 56 on the edges of the liner sheets 66 to distinguish between layers, however tabs 56 are applied on opposing edges of sequencing liner sheets 66, while liner sheets 66 are shifted, creating a pitter patter effect with tabs 56 hidden underneath top liner sheets 66 until top layer is removed. The separate tabs 56 could be tape/film of plastic or paper (e.g. ¾" wide, with or without adhesive) to be applied on the ends of the protective tape on either the top or bottom, preferably the bottom (this side of the protective tape has the adhesive). This tape/film could be of various colors and designs and will serve as an aid for the consumer to pull apart the layers of liner sheets 66.

Figure 12:
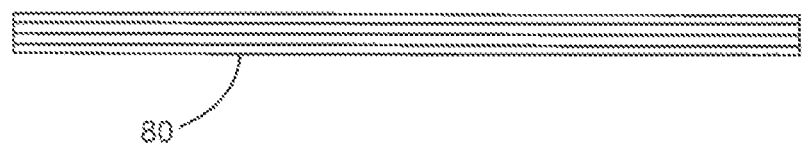
FIG. 12 is a side view of a pad of liner sheets.
Figure 13:
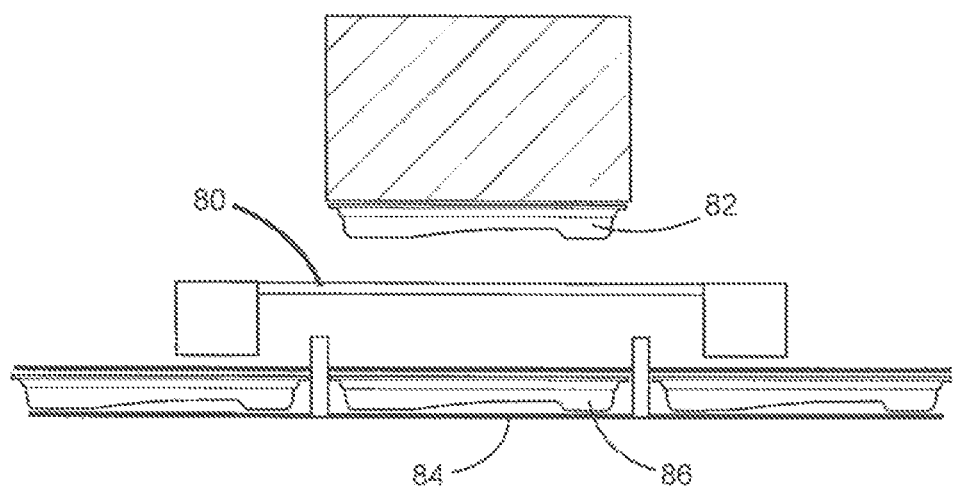
FIG. 13 is a sectional side view of a stamping apparatus and a pad of liner sheets.
Figure 14:
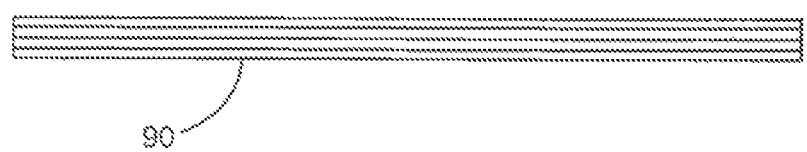
FIG. 14 is a side view of a stack of substrate and sheets.
Figure 15:
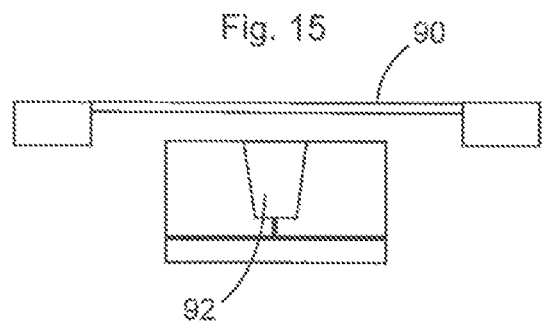
FIG. 15 is a sectional side view of a stack of substrate and sheets in preparation for molding into a female cavity mold.
Figure 16:
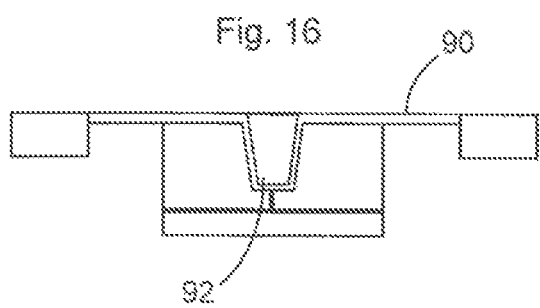
FIG. 16 is a sectional side view of a stack of substrate and sheets molded into a female cavity mold.

While the subject matter disclosed herein is described primarily in terms of the manufacture of a paint tray with a stack of thermoformed sheet liners conforming to the interior dimensions of the paint tray, it will be apparent that the broad concept of the subject matter disclosed herein can be modified for other applications. For example, as illustrated in FIGS. 12 and 13, instead of simultaneously shaping the substrate that forms the tray or other product and the liner sheets, the substrate can be initially formed into the tray, or the tray can be otherwise manufactured. A pad of liner sheets 80 can then be formed within the tray. That is, a mold of the image of the product, e.g., paint tray 82, is suspended above the product (e.g., paint tray in plastic or metal) and sandwiched in between is a continuous roll of liner sheets 80. The paint tray will be moving along a conveyor 84 and when the paint tray is nested opposing the mold image of the product 86, the two parts are "stamped" together, thus creating the finished product with the pads of liner sheets. Similarly, a pad of liner sheets can be stamped into a known animal litter tray, In another alternative illustrated in FIGS. 14-16, multiple layers of plastic sheets 90 having the same thickness, instead of liner sheets, can be thermoformed simultaneously, in order to make multiple products. Applied applications for this would be various containers such as plastic egg cartons, cookie trays (e.g., Oreo), dessert gelatin containers, computer keyboard covers, blister packs, rigid paint tray liners, rigid animal litter tray liners, etc. The substrate is a more rigid material, while the liner sheets are more stretchable and pliable, such as a garbage bag. The plastic sheets 90 in this process are of a lesser thickness than the paint tray of 0.030, but not as thin as the liners.

This latter process ideally uses about 3 to 6 or more layers in roll form. A coating, adhesive barrier, release agent, or film will be applied to or placed in between the sheets where needed and in any combination to prevent the sheets from melting/bonding together in the thermoforming process, and for allowing the finished products to be separated easily (e.g., a form of silicone may be introduced between the layers of sheets while a zone coat of adhesive (e.g., 1 inch wide) may be applied along the edge of the substrate). This adhesion allows for easier transport of the roll of sheets by keeping the material together in roll form more effectively. Multiple sheets of approximate thickness 0.010" each are stacked together with a barrier/adhesion between each layer. The multi-sheet layers are rolled together and then sold to various thermoforming companies. Ultimately time and money are saved by the thermoformers, allowing them to be more efficient. Sheets 90 are thermoformed by being drawn or pressed into a mold 92 having the desired cavity shape.

Example 1

Peelable Cat Litter Tray

A tray suitable for use by domestic cats, rabbits, ferrets, chinchillas, or other similarly-sized animals as a litter box was made. A substrate sheet of thermoformable plastic was formed into a tray having strength and rigidity sufficient for containing a clumpable cat litter within its concave interior portion and for maintaining its integrity upon ingress and egress of domestic cats. The tray had a lip a flange) surrounding the entire interior portion at the periphery of the tray. Prior to forming the tray, multiple peelable polymeric liner sheets were peelably adhered to the substrate sheet to form a stack having an overlapping portion, in the overlapping portion, each of the liner sheets overlapped the substrate sheet and all other liner sheets interposed between it and the substrate sheet. During thermoforming, the tray was formed in the overlapping portion. After forming, the stack was trimmed along the periphery of the lip, so that substantially the entire trimmed tray was contained within the overlapping portion. Adhesive was omitted beneath the liner sheets at a portion corresponding to one of two position of the lip on opposited sides of the interior portion, such that adhesive was present beneath each liner sheet in substantially the entire interior portion, but was not present at one of the two positions, with the position alternating between adjacent sheets. The resulting product was a tray covered on its entire interior portion with overlapping peelable sheets, with each peelable sheet being non-adhered to a portion of the lip at one of the two positions and easily peelable therefrom. When the tray was positioned such that the two positions were on the left and on the right, a sheet easily peelable from the right lip was atop a second sheet easily peelable from the left lip, which was atop a third sheet easily peelable from the right lip, and so on.

After thermoforming the tray, a die was urged against the lined interior surface of the tray. The die had multiple circular blades that were sufficiently sharp to cut through the liner sheets when urged against them. The blades and the die were positioned so that circular perforations (at least a few hundred) approximately ⅜ inch in diameter were cut through the liner sheets substantially only in the flat central portion of the interior. No holes were cut in the sidewalk surrounding the central portion. The die was urged against the tray with sufficient force and with sufficient displacement to perforate substantially all of the liners without perforating the substrate sheet. After this operation, the tray had perforated liner sheets covering its interior portion. Some circular, cut portions of the perforated liner sheet came away from the interior when the die was removed therefrom. Other cut portions could be peeled away without peeling the liner sheet having a circular perforation therein. Still other cut portions remained in place (albeit severed from the liner sheets with Which they were once integral). In operation, it was observed to be immaterial whether the circular cut portions remained in place or were removed.

The interior portion (estimated capacity was about 5-7 gallons) of the tray was filled with about a gallon of a commercial clumpable cat litter product. The liner upon which the litter rested was peeled from about the lip of the tray, beginning at the portion of the lip to which one edge of the liner was not adhered. After the liner had been peeled from about the lip, it was peeled from the sidewalk of the tray. A small amount of the litter passed through perforations that extended through the liner and were situated near the interior corners of the tray (where a portion of the liner was peeled from the flat central portion of the tray while peeling it from adjacent side walls). Next, the liner that had been peeled from the lip and the side walls was grasped at four points (approximately the corners of the tray), with two adjacent corners being held in each hand of the user. The liner was peeled from the flat central portion of the tray using a rocking motion, wherein the corners held in one hand were lifted, and then the corners held in the other hand were lifted. As the liner was peeled from the tray, the cat litter flowed freely through the perforations and landed within the interior of the tray, atop the liner beneath the liner that was being peeled. Peeling of the liner from the flat central portion of the tray was completed within 2-4 seconds, and the peeled liner was held above the tray for about 10-15 additional seconds while all of the litter contained within the peeled liner poured therefrom through perforations (save a very small quantity which passed through the perforations following gentle shaking.

Several golf balls were deposited atop the litter, and the second liner (the one that originally was beneath the exterior liner sheet was peeled in a similar manner, beginning at the opposite edge of the lip (at which edge the second liner was intentionally not adhered). Similar results were observed, with substantially all litter pouring through the perforations in less than about 20 seconds, while the golf balls were retained within the interior of the peeled second liner.

The litter box was then placed into a confined space with six domestic cats which were accustomed to using the clumpable litter in commercially available, typical cat litter pan. After a period of about a day, the cats had deposited multiple feces and several aliquots of urine within the litter. Using substantially the same technique described above for the clean litter and the litter having golf balls thereon, a human peeled the uppermost liner from the tray and held it suspended above the tray as litter filtered through the perforations. After less than about 30 seconds, litter ceased flowing. No feces appeared to pass through the perforations, and several clumped boluses of urine and litter were observed to be retained within the liner.

Upon moving the liner toward a trash receptacle, additional litter was observed to pass through the perforations. In an attempt to free unused litter, the liner was shaken by the human. Owing to the vigor of the shaking, some urine-litter clumps broke up and small particles of such clumps passed through the perforations and back into the interior of the tray. When the experiment was repeated with fresh litter and more gentle shaking of the separated tray contents, substantially no urine-litter clumps broke up and passed through the perforations.

The human user of the tray observed significantly less urine-like odor remained in the tray, relative to the degree of odor that the user normally experienced after removing clumped litter and feces using a slotted shovel. The user attributed that observation to the fact that clumped materials removed using the slotted shovel were frequently broken up during removal, while substantially less breaking up was observed when the liners were peeled from the tray (excepting the first instance described above). The user reported that he would ordinarily discard the entire contents of the litter tray and refill it after the six cats had used it for three or four days, even with daily shoveling, on account of the residual odor. The user was able to use the litter continuously for more than a week (although he had to add more litter) without discarding the residuum when the liner-peeling method was employed.

Example 2

Another litter box suitable for use by domestic cats was made using a pair of the tray described in Example 1, except that each tray had four holes extending completely through the lip of the tray, one at each corner of the rounded rectangular tray having sides that sloped inwardly at an angle of about 75 degrees. One tray was placed on the floor, as with a normal litter tray. A piece of cardboard was cut and bent into roughly the shape of the letter C when viewed from the edge of the cardboard. Eight tabs extended from the cardboard, four along each of the opposite ends, spaced to correspond to the position of the holes in the trays. If the cardboard was viewed from one edge, it would appear to have the conformation of the letter C, with four tabs extending from the viewing edge toward the viewer and the other four tabs extending away from the viewer from the opposite (obscured) edge. Four tabs along one edge of the cardboard were placed into the four holes in the tray resting upon the floor. The cardboard rose above the lower tray a constant distance (about 12-14 inches) about the perimeter of three sides thereof (i.e., having the conformation of the letter C when viewed from above). A second identical tray was inverted and its holes were positioned above the four other tabs, after which the second tray was urged downward toward the first and the cardboard. Thus, the cardboard rested on the lip of the lower tray and obscured entry into the lower tray along three edges of that tray. The lip of the second tray rested atop the cardboard, forming a roof-like structure. The cardboard served as a connector for the two trays, maintaining them in a selected fixed position relative to one another and limiting access to the interior of the box to an opening formed by the edges of the two trays and the cardboard connector. Overall, the assembly had the approximate appearance of a "closed" commercial cat litter box (i.e., an elongated cube having an entryway in only one face).

The cats described in Example 1 made regular use of the litter box formed from a pair of trays having the cardboard connector interposed between them when the lower tray was filled with about 1.5 gallons of clumping cat litter and they were provided access to it.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. An animal litter box comprising first and second containers, the box including:
the first container; and
a cover that comprises the second container and a connector that is removably engagable with each of the first container and the second container and substantially encloses the interior surface of the first container,
the cover being removably engagable with the first container and defining an entryway through which the animal can pass between the enclosed interior surface and the exterior of the box,
wherein when the connector is engaged with the first container the connector maintains the second container in a substantially fixed position with respect to the first container,
wherein each container comprising:
a) a substrate having a concave interior surface; and
b) a plurality of peelable liner sheets including a bottom sheet,
each sheet conforming to a substantial portion of the interior surface and having a lower surface and an upper surface,
the lower surface of each sheet other than the bottom sheet being releasably adhered to the upper surface of the underlying sheet with a peelable adhesive on substantially the entire lower surface of the sheet,
the lower surface of the bottom sheet being releasably adhered to the interior surface with a peelable adhesive on substantially the entire lower surface of the bottom sheet,
at least the sheet most distal from the substrate having perforations extending between the lower surface and the upper surface thereof,
the perforations being dimensioned such that at least one of ordinary animal feces and soiled animal litter cannot pass therethrough.

2. The box of claim 1, wherein the connector is a relatively rigid material that extends between the first and second containers and includes roof tabs engagable with holes in the second container and base tabs engagable with holes in the first container.

3. The box of claim 2, wherein the relatively rigid material is corrugated cardboard.

4. The box of claim 2, wherein the periphery of the interior portion of the second container substantially mirrors the periphery of the interior portion of the first container when the first and second containers are situated in an inverted conformation relative to one another with their interior portions facing one another.

\* \* \* \* \*